United States Patent
Watanabe

[11] Patent Number: 6,089,681
[45] Date of Patent: Jul. 18, 2000

[54] ANTISKID CONTROL APPARATUS

[75] Inventor: Takashi Watanabe, Nagoya, Japan

[73] Assignee: Denso Corporation, Kariya, Japan

[21] Appl. No.: 09/008,475

[22] Filed: Jan. 16, 1998

[30] Foreign Application Priority Data

Jan. 21, 1997 [JP] Japan .................................. 9-08593
Jan. 21, 1997 [JP] Japan .................................. 9-08594

[51] Int. Cl.⁷ .................................. B60T 8/34; B60T 8/40
[52] U.S. Cl. ................... 303/158; 303/113.5; 303/116.2
[58] Field of Search .............................. 303/113.1, 113.5, 303/116.1, 116.2, 155, 156, 163, 169

[56] References Cited

U.S. PATENT DOCUMENTS

| | | |
|---|---|---|
| 4,912,641 | 3/1990 | Kuwana et al. . |
| 5,171,070 | 12/1992 | Okazaki et al. . |
| 5,176,430 | 1/1993 | Kuwana et al. ........................ 303/158 |
| 5,220,506 | 6/1993 | Kuwana et al. ........................ 701/79 |
| 5,461,565 | 10/1995 | Sakane et al. ........................ 701/78 |
| 5,538,334 | 7/1996 | Kushi et al. ........................ 303/115.4 |
| 5,697,682 | 12/1997 | Watanabe et al. ........................ 303/169 |

FOREIGN PATENT DOCUMENTS

| | | |
|---|---|---|
| 60-209356 | 10/1985 | Japan . |
| 61-287850 | 12/1986 | Japan . |
| 62-299465 | 12/1987 | Japan . |
| 64-47655 | 2/1989 | Japan . |
| 1-182154 | 7/1989 | Japan . |
| 1-273760 | 11/1989 | Japan . |
| 2-81759 | 3/1990 | Japan . |
| 2-169359 | 6/1990 | Japan . |
| 2-182561 | 7/1990 | Japan . |
| 2-290764 | 11/1990 | Japan . |
| 3-143761 | 6/1991 | Japan . |
| 5-116617 | 5/1993 | Japan . |
| 2 295 210 | 5/1995 | United Kingdom . |

*Primary Examiner*—Chris Schwartz
*Attorney, Agent, or Firm*—Pillsbury Madison & Sutro LLP

[57] ABSTRACT

In an antiskid control apparatus, brake pressures of a plurality of wheels are increased by using a hydraulic pressure generated by a master cylinder. When the running speed of a vehicle becomes lower than predetermined value due to a braking operation, a brake-pressure adjusting unit increases the brake pressures applied to the plurality of wheels with timings different from each other. In this way, it is possible to reduce changes with time in amount of fluid flowing out of the master cylinder.

21 Claims, 11 Drawing Sheets

FIG. 12
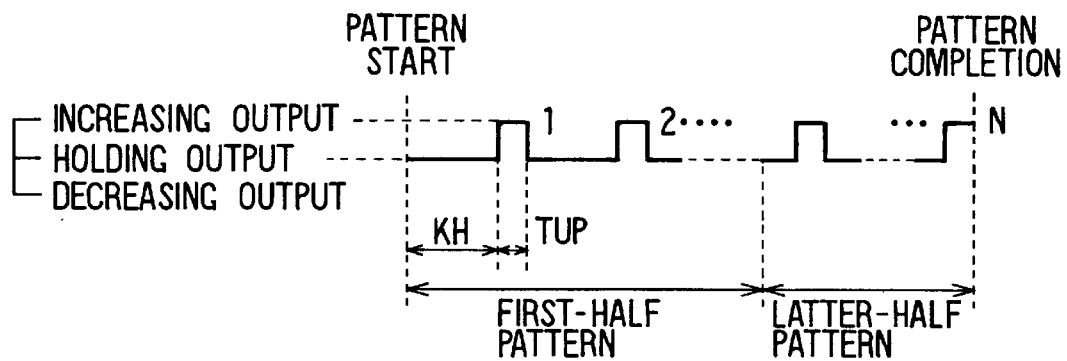
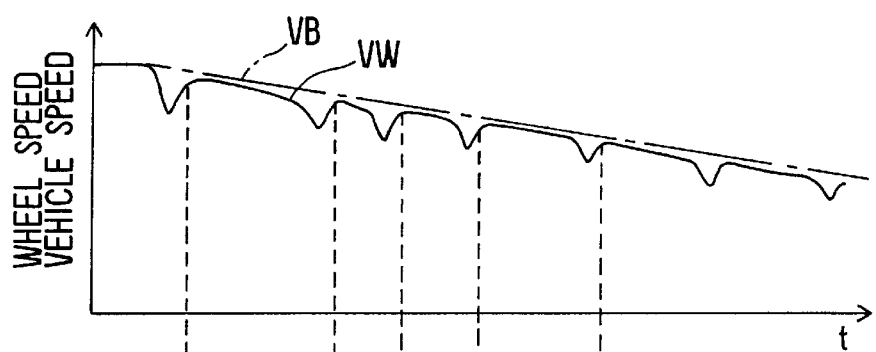
FIG. 14A
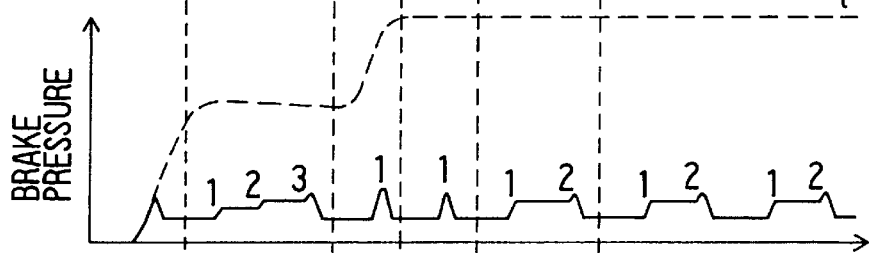
FIG. 14B
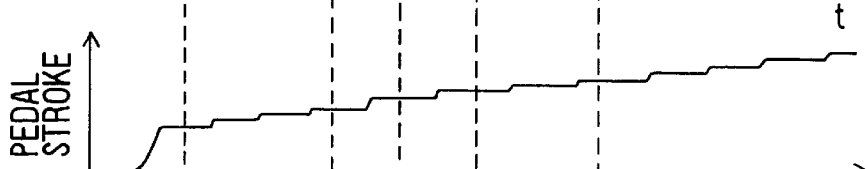
FIG. 14C
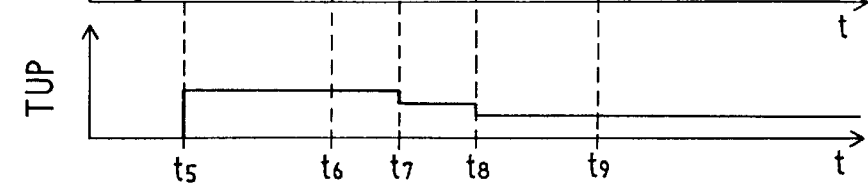
FIG. 14D

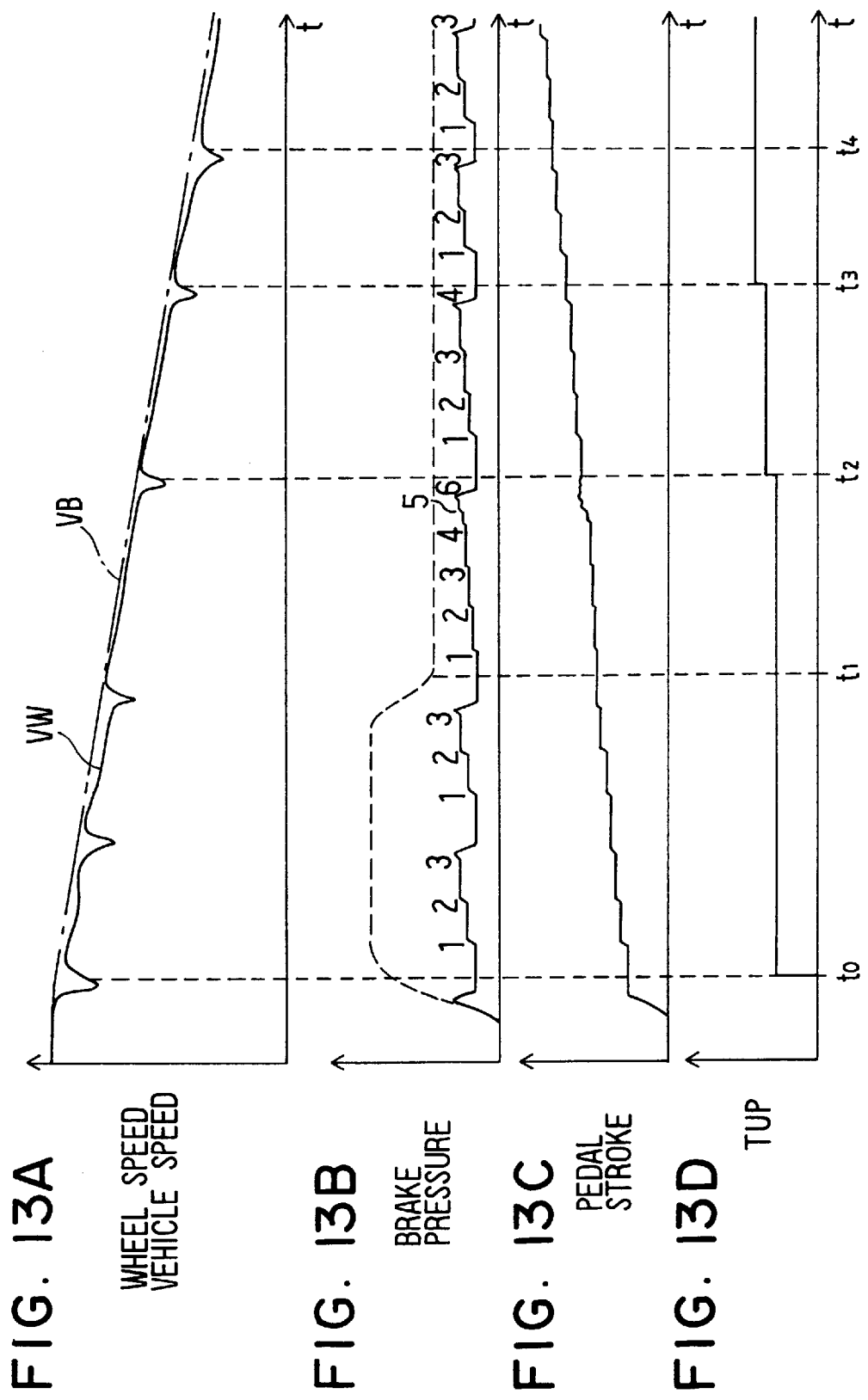
FIG. 13A WHEEL SPEED VEHICLE SPEED
FIG. 13B BRAKE PRESSURE
FIG. 13C PEDAL STROKE
FIG. 13D TUP

ANTISKID CONTROL APPARATUS

CROSS REFERENCE TO RELATED APPLICATION

This application is based upon and claims the benefit of priority of Japanese Patent Applications No. H.9-8593 and No. H.9-8594 both filed on Jan. 21, 1997, the contents of which are incorporated herein by reference.

BACKGROUND OF THE INVENTION

1. Field of the Invention

The present invention relates to an antiskid control apparatus for controlling the slip of a wheel which occurs upon application of the brake in a vehicle. To be more specific, the present invention relates to an antiskid control apparatus for increasing brake pressure by using a hydraulic pressure generated by a master cylinder.

2. Description of the Related Art

A conventional antiskid control apparatus comprises a slip-state detecting unit for detecting slip states of wheels during braking, a master cylinder for generating a hydraulic pressure according to the application of the brake pedal and a brake-pressure adjusting unit for increasing and decreasing brake pressure applied to the wheels so that slip states detected by the slip-state detecting unit are controlled to predetermined states. The brake-pressure-adjusting unit increases the brake pressure by using the hydraulic pressure generated by the master cylinder. Due to this structure, the antiskid control unit can prevent skidding and satisfactorily shorten a braking distance.

However, it is difficult to detect slip states of wheels at low speeds because the accuracy of signal detection by wheel speed sensors deteriorates. In order to solve this problem, antiskid control ceases when the speed of the vehicle drops below a predetermined value. When the antiskid control ends, brake fluid flowing from the master cylinder is supplied to a brake unit (wheel cylinders) in the conventional manner.

In the antiskid control unit described above, however, movement of the brake pedal during antiskid control is restricted because the brake-pressure adjusting unit increases the brake pressure by using the hydraulic pressure generated by the master cylinder and decreases it while cutting off the conduit connected to the master cylinder. Then, when antiskid control ceases, the brake fluid flowing from the master cylinder is supplied to the brake unit without antiskid control. As a result, a driver feels an abrupt difference in the sensitivity of the brake pedal and in the force required to operate the brake pedal. To the driver, it appears that the necessary force to apply to the brake pedal decreases abruptly as soon as antiskid control stops. Therefore, at low speeds, the feedback to the driver from application of the brake is unacceptable because it is not consistent through non-antiskid control and antiskid control.

It is thus a first object of the present invention to provide an antiskid control apparatus that generates a consistent and acceptable feedback feeling to a driver during a brake-pedal operation, at low speeds and which also prevents the driver from receiving inconsistent feedback throughout the braking process.

In addition, typically the restriction on the movement of the brake pedal during antiskid control causes the brake pedal to move a predetermined length only after a certain amount of time. This causes awkward feedback to the driver who feels that he or she cannot depress the brake pedal because the pedal hardly moves. To contrary, the brake pedal may be allowed to move the predetermined length in a much shorter amount of time. This causes the driver to receive feedback from the brake pedal indicating that applying force to the brake pedal will push the brake pedal to the bottom of its stroke. It is thus a second object of the present invention to provide an antiskid control apparatus that provides acceptable and consistent brake-pedal operation feedback to the driver by adjusting the time spent for the movement of the brake pedal.

SUMMARY OF THE INVENTION

In order to achieve the first object described above, the present invention provides an antiskid control apparatus which increases brake pressures of a plurality of wheels by using a hydraulic pressure generated by a master cylinder. When the speed of a vehicle drops below a predetermined value by braking, a brake-pressure adjusting unit increases the brake pressures applied to the plurality of wheels at different timings. In this way, it is possible to reduce the amount of fluid flowing out from the master cylinder.

Specifically, changing the amount of fluid flowing out from the master cylinder per unit time can be reduced because fluids for increasing the brake pressures applied to the wheels flow from the master cylinder at timings different from each other. As a result, the amount of fluid flowing out from the master cylinder per unit time decreases slowly. Consequently, according to the present invention, the brake pedal operation feedback to the driver is not unacceptable even in the at low speeds, and does not give a feedback sense of inconsistency to the driver.

When the speed of the vehicle drops below a predetermined value due to braking, the brake-pressure adjusting unit can either increase or decrease the brake pressures applied to the wheels so that the amount of the fluid flowing from the master cylinder is adjusted to a value close to the amount of fluid which had been flowing out from the master cylinder just before the speed of the vehicle reached the predetermined value. In this case, the amount of fluid flowing out from the master cylinder before and after the speed drops below the predetermined value are approximately equivalent, thus reducing the changes in the amount of fluid flowing from the master cylinder per unit time over the braking operation. As a result, the brake-pedal operation feedback to the driver is acceptable even in the low-speed range, and provides a sense of consistency to the driver.

When an antiskid control apparatus uses the master cylinder as the sole pressure source, fluid flowing from the master cylinder is supplied unmodified for increasing the brake pressure. Thus, by disabling the flow of the fluid from the master cylinder, the brake pressure can be reduced or maintained at the current value. For the reasons described above, the operation of the brake-pressure adjusting unit is directly reflected in the pedal feedback to the driver during a brake-pedal operation. In an antiskid control apparatus having a pressure source other than the master cylinder, on the other hand, a so-called kickback is experienced, a phenomenon in which the brake pedal is pushed back during a braking operation. In these devices, the driver does not receive unacceptable feedback from the brake pedal even if the brake-pedal operation feedback changes. In the antiskid control apparatus having the master cylinder as a sole pressure source, however, the kickback does not occur. For this reason, a sense of inconsistency due to the change in brake-pedal operation feedback is strongly felt by the driver. This increases the demand for the present invention, which prevents the brake-pedal operation feedback from being unacceptable.

The present invention prevents the brake-pedal operation feedback from being unacceptable even when an antiskid control apparatus has the master cylinder as a sole pressure source.

In order to achieve the second object of the present invention, the present invention provides an antiskid control apparatus in which brake pressure is increased by using a hydraulic pressure generated by a master cylinder, and a brake-pressure adjusting unit alternatively increases and decreases a brake pressure applied to a wheel so as to control a slip state of the wheel to a proper condition. Particularly, the brake-pressure adjusting unit adjusts the brake pressure in such a way that the number of operations to increase the brake pressure per unit time is within a predetermined range.

Since the brake-pressure adjusting unit increases the brake pressure by using a hydraulic pressure generated by the master cylinder, the number of operations to increase the brake pressure per unit time is well reflected in the time period spent on the movement of a predetermined stroke of the brake pedal. The present invention controls the amount of time for the brake pedal to be within a predetermined stroke range, thus improving the brake-pedal operation.

When an antiskid control apparatus uses the master cylinder as a sole pressure source, fluid flowing from the master cylinder is supplied unmodified for increasing a brake pressure applied to a wheel. When there is no need to increase the brake pressure, the flow of fluid from the master cylinder is stopped. Thus, the operation carried out by the brake-pressure-adjusting unit to increase the brake pressure is directly related to the movement of the brake pedal. According to the present invention, since the number of operations to increase the brake pressure per unit time is adjusted to a proper value, the effect of the number of operations adjusted to a proper value can be directly observed as a brake-pedal operation feedback to the driver.

Preferably, the brake-pressure-adjusting unit adjusts the brake pressure by increasing the brake pressure using 1.5 to 3.5 pressure-increasing operations per second. These values are transformed into movement speeds of a brake pedal employed in an ordinary vehicle as the range 3 to 7 mm/sec. The values of the movement speeds result in a very good brake-pedal operation feedback.

Preferably, the brake-pressure adjusting unit gradually increases the brake pressure pressure-increasing operations per second when a slip state of a wheel is small and decreases or maintains the brake pressure when the slip state is large. In order to make the pressure increasing adjustment of the brake pressure more effective, when increasing the brake pressure, the number of consecutive pressure-increasing operations carried out so far by the brake-pressure adjusting unit is counted and the increase in brake pressure resulting from one pressure-increasing operation is adjusted so that the counted number of consecutive operations is within the predetermined range. In this way, a very good braking force is obtained which shortens the required braking distance.

In the adjustment of the brake pressure, the increase in brake pressure resulting from one pressure-increasing operation varies depending on the force applied to the brake pedal. If the applied force is very large, for example, the brake pressure increases abruptly as a result of one pressure-increasing operation, resulting in an excessively large slip of the wheel in some cases. If the applied force is very weak, on the other hand, although the large slip of the wheel does not occur, the brake pressure hardly increases and the braking distance may be extended.

In order to solve the problems described above, it is preferable to count the number of consecutive pressure-increasing operations carried out thus far and to increase the brake pressure resulting from one pressure-increasing operation whereby the counted number of consecutive pressure-increasing operations falls within a predetermined range. The result of this structure is that the vehicle can always be stopped in a stable manner regardless of the force applied to the brake pedal and the conditions of the surface of the road.

BRIEF DESCRIPTION OF THE DRAWINGS

Embodiments of the present invention will be described with reference to the following drawings, wherein:

FIG. 12 is a time chart of an output signal generated to control the brake pressure in the pulse pressure increasing mode of the third embodiment;

FIGS. 13A to 13D are time charts for illustrating effects of the processing in the third embodiment when the force applied to the brake pedal is weakened; and FIGS. 14A to 14D are time charts for illustrating the effects of the processing in the third embodiment when the force applied to the brake pedal is strengthened.

DETAILED DESCRIPTION OF THE PREFERRED EMBODIMENTS

Figure 1:
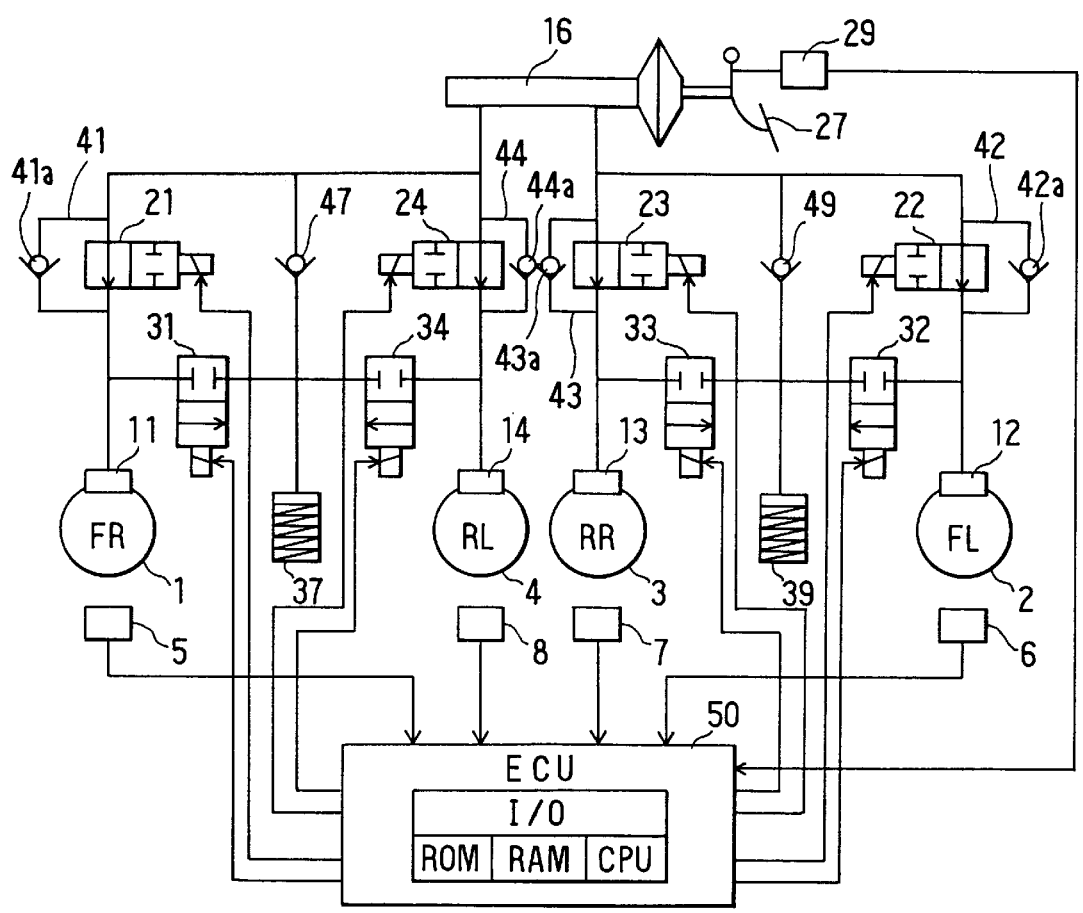
FIG. 1 is a schematic diagram showing the configuration of an antiskid control apparatus provided by the present invention in a simple and plain way.

The present invention will become more apparent from a careful study of the following detailed description of some preferred embodiments with reference to the accompanying diagrams. FIG. 1 is a diagram showing the configuration of an antiskid control apparatus provided by the present invention in a simple and plain way. As shown in FIG. 1, a front right wheel 1, a front left wheel 2, a rear right wheel 3 and a rear left wheel 4 are provided with wheel speed sensors 5 to 8 of a magnetic pickup type or a magneto-resistive-element (MRE) type, respectively. The wheel speed sensors 5 to 8 generate pulse signals representing the rotation speeds of the wheels 1 to 4 respectively.

In addition, the front right wheel 1, the front left wheel 2, the rear right wheel 3 and the rear left wheel 4 are provided with hydraulic brake apparatuses (also referred to hereafter as wheel cylinders) 11 to 14 respectively. A hydraulic pressure generated by a master cylinder 16 is transmitted to the wheel cylinders 11 to 14 by way of actuators 21 to 24 respectively and respective hydraulic pipes. It should be noted that the master cylinder 16 is a well-known master cylinder for generating a hydraulic pressure due to an operation to step on a brake pedal 27. The stepped-on state of the brake pedal 27 is detected by a stop switch 29.

The wheel cylinders 11 and 14 are connected to a reservoir 37 through actuators 31 and 34 respectively whereas the wheel cylinders 12 and 13 are connected to a reservoir 39 through actuators 32 and 33 respectively. It should be noted that the actuators 21 to 24 and 31 to 34 are each an electromagnetic two-position valve having a pass-through position and a cut-off position.

By-pass pipes 41 to 44 are provided between the upstream and down stream sides of the actuators 21 to 24 respectively. The by-pass pipes 41 to 44 are provided with reversed-flow blocking valves 41a to 44a respectively, which are used for allowing only fluid to flow from the wheel cylinders 11 to 14 to the master cylinder 16 to by-pass the actuators 21 to 24. The reservoirs 37 and 39 are connected to the master cylinder 16 through reversed-flow blocking valves 47 and 49 respectively. The reversed-flow blocking valves 47 and 49 are used for allowing fluids to flow only from the reservoirs 37 and 39 to the master cylinder 16.

The detection signals of the wheel sensors 5 to 8 and the stop switch 29 are supplied to an electronic control circuit (ECU) 50. The electronic control circuit 50 is a well-known microcomputer comprising a CPU, a ROM unit, a RAM unit and an I/O circuit. Receiving the detection signals, the electronic control unit 50 outputs signals for controlling the actuators 21 to 24 and 31 to 34. The control signals include signals to increase, maintain and decrease the hydraulic pressures applied to the wheel cylinders 11 to 14 of the wheels 1 to 4 respectively.

The operations of the actuators 21 to 24 and 31 to 34 will be explained with the front right wheel 1 taken as an example. When a pressure increasing output to increase the hydraulic pressure applied to the wheel cylinder 11 of the front right wheel 1 is provided from the electronic control unit 50, the actuator 21 is driven to its pass-through position and the actuator 31 is driven to its cut-off position. At these positions, the hydraulic pressure generated by the master cylinder 16 is applied to the wheel cylinder 11 without modification.

When a pressure holding output to maintain the hydraulic pressure applied to the wheel cylinder 11 of the front right wheel 1 is provided from the electronic control unit 50, the actuators 21 and 31 are both driven to their cut-off positions. At these positions, the hydraulic pressure applied to the wheel cylinder 11 is maintained. It should be noted that, if the force of stepping on the brake pedal 27 is weakened while the pressure holding output to maintain the hydraulic pressure applied to the wheel cylinder 11 of the front right wheel 1 is being provided, a pressure fluid flows through the by-pass pipe 41, reducing the hydraulic pressure applied to the wheel cylinder 11.

When a pressure decreasing output to decrease the hydraulic pressure applied to the wheel cylinder 11 of the front right wheel 1 is provided from the electronic control unit 50, the actuator 21 is driven to its cut-off position but the actuator 31 is driven to its pass-through position. As a result, the pressure fluid of the wheel cylinder 11 flows to the reservoir 37 by way of the actuator 31, reducing the hydraulic pressure applied to the wheel cylinder 11. It should be noted that operations to increase, maintain and decrease hydraulic pressures applied to the other wheels 2 to 4 are carried out in the same way as the operations carried out for the front right wheel 1.

Next, details of the processing carried out by the electronic control unit 50 are explained by referring to flow-charts shown in FIGS. 2 to 6. When the ignition key is turned to an ON state, the electronic control circuit 50 executes a main routine shown in FIG. 2. It should be noted that the electronic control unit 50 executes this main routine for each of the wheels 1 to 4 on a time-division basis.

Figure 2:
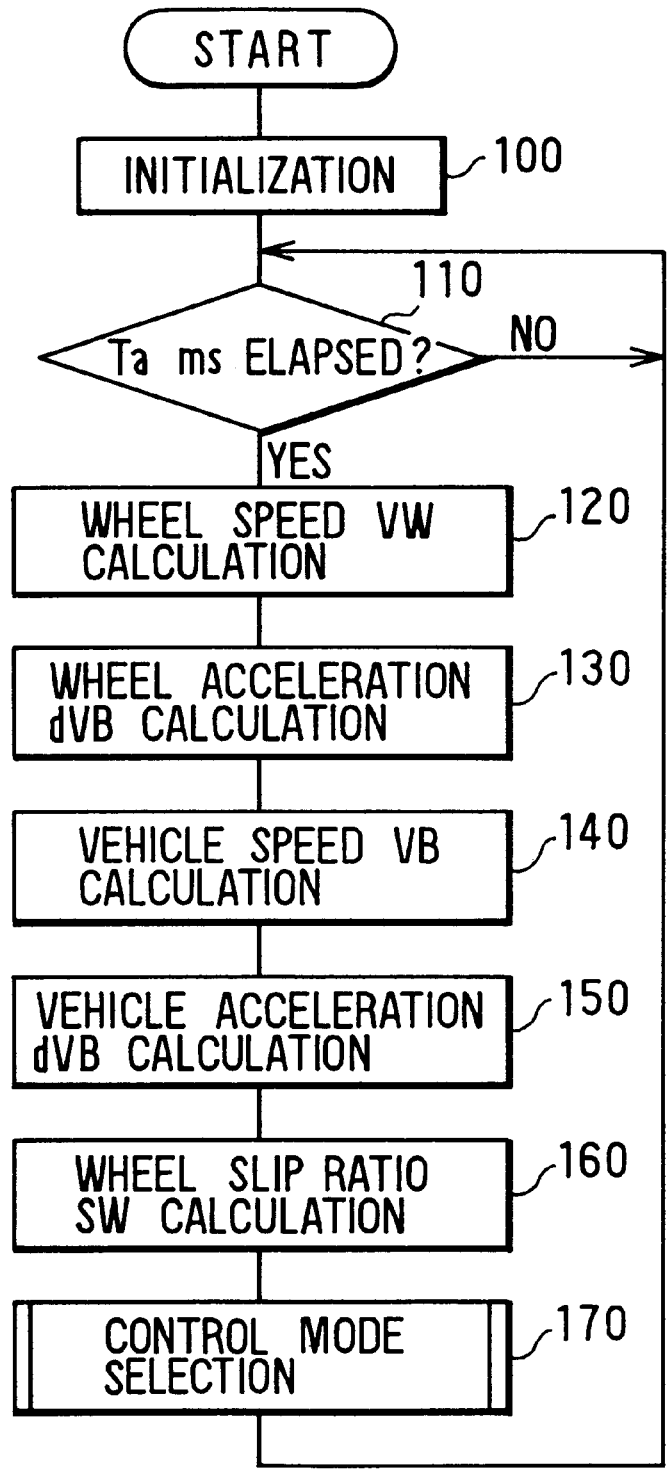
FIG. 2 is a flowchart of operations executed by the antiskid control apparatus.

As shown in FIG. 2, the flowchart begins with step 100 at which the processing is started by executing initialization. In the initialization, the contents of a variety of variables in the RAM unit and counters are cleared and a variety of flags are reset. Next, step 110 determines whether or not a predetermined time Ta ms (typically 5 ms) has elapsed since the immediately previous execution of the main routine. If the predetermined time Ta has not elapsed, the electronic control unit 50 enters a waiting state by repeating step 110 until the predetermined time Ta elapses. If it is determined to be "YES" at step 110, indicating that the predetermined time Ta has elapsed, on the other hand, processing proceeds to step 120.

At step 120, the speed VW of the wheel 1, 2, 3 or 4 being controlled is computed from a signal detected by the wheel sensor 5, 6, 7 or 8. Then, at step 130, the wheel speed. VW is differentiated with respect to time to produce the acceleration dVW of the wheel. Subsequently, at step 140, the speed VB of the vehicle, or more precisely, an estimated vehicle speed, is calculated from the wheel speed VW found at step 120 as follows. The wheel speed VW used in the calculation of the vehicle speed VB is the maximum value among the wheel speeds of the wheels 1 to 4. In the calculation of the vehicle speed VB, the vehicle speed VB computed in the immediately previous execution of the main routine is also used. In detail, an upper limit speed and a lower limit speed are calculated based on the previously-computed vehicle speed VB. The upper limit speed is a speed when the vehicle accelerates from the previously computed vehicle speed VB with a maximum acceleration that the vehicle can have in an actual driving state The lower limit speed is a speed when the vehicle decelerates from the previously computed vehicle speed VB with a maximum deceleration that the vehicle can have in an actual driving state. An intermediate value among the maximum wheel speed and the upper and lower limit speeds is then taken as an estimated vehicle speed VB. It is to be noted that since the variable for the previously-computed vehicle speed VB is cleared in the initialization carried out at step 100, a vehicle speed VB of zero will be found in a first execution of the main routine.

At step 150, the vehicle speed VB calculated at step 140 is differentiated with respect to time to produce an acceleration dVB of the vehicle. Then, the flow of processing proceeds to step 160 at which a wheel slip ratio SW is computed. Subsequently, the flow of processing continues to step 170.

Figure 3:
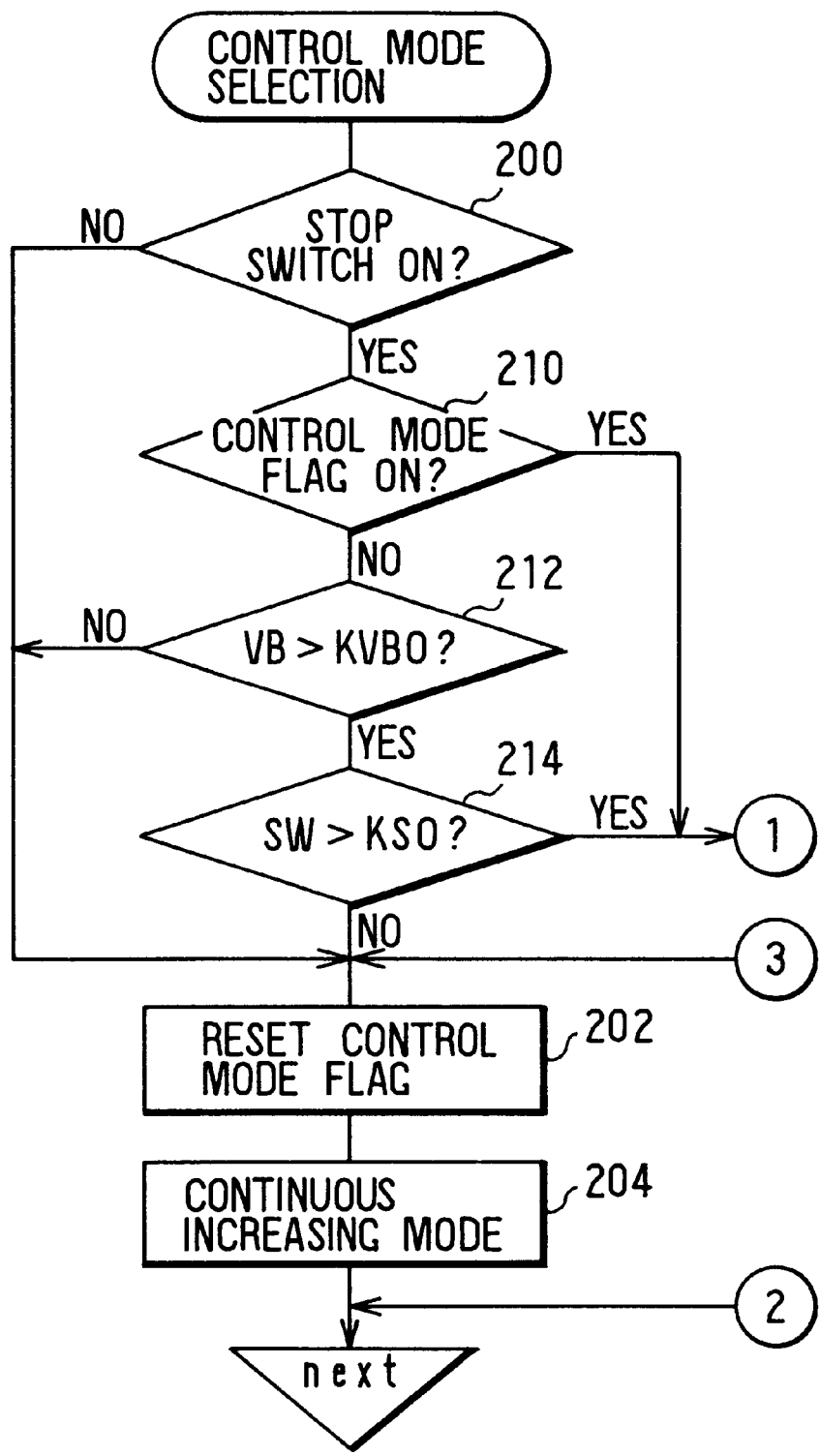
FIG. 3 is a flowchart representing processing to determine whether or not antiskid control is required.
Figure 4:
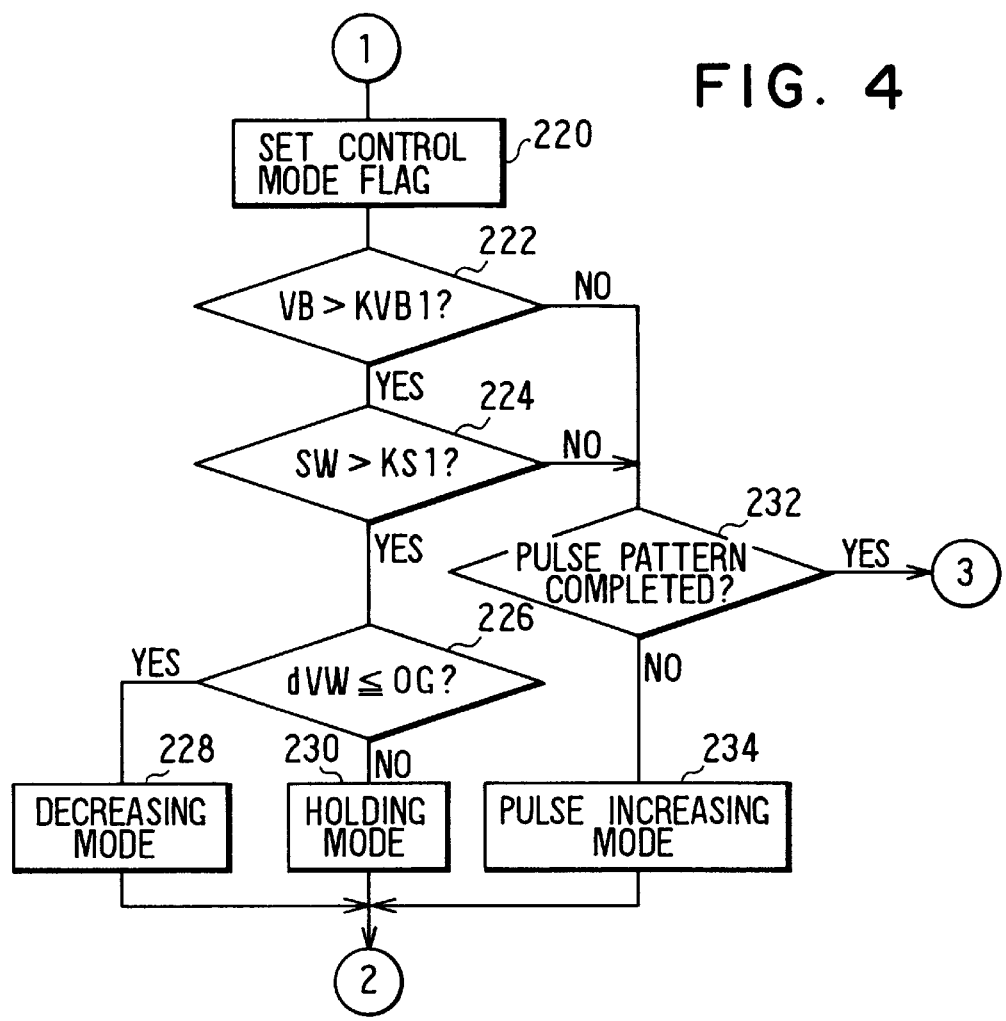
FIG. 4 is a flowchart representing a continuation of the processing shown in FIG. 3 to select a control mode in antiskid control.

Step 170 determines whether or not antiskid control is required and, if the antiskid control is required, selects one of control modes in antiskid control represented by flow-charts shown in FIGS. 3 and 4. As shown in FIG. 3, the flowchart begins, at step 200 to determine whether or not the brake pedal 27 has been applied, that is, the stop switch 29 is in an ON state. If the determination at step 200 is NO indicating that the stop switch 29 is in an OFF state, that is, the driver has not applied the brake, the flow of the processing proceeds to step 202 which resets a control-mode flag for indicating that antiskid control is being executed. The flow of the processing then proceeds to step 204 to enter a continuous pressure increasing mode before returning to the main routine shown in FIG. 2. In this way, the processing carried out at step 170 of the main routine shown in FIG. 2 is completed and the flow of processing returns to step 110. After the predetermined time Ta has elapsed since the immediately previous execution of the main routine, the processing described above in a following execution of the main routine is repeated.

It should be noted that the continuous pressure increasing mode cited above is a mode in which a pressure increasing output for increasing the brake pressure of the wheel is continuously provided by the electronic control unit 50. Therefore, if the determination at step 200 is NO indicating that a braking operation is not carried out on the vehicle, the hydraulic pressure generated by the master cylinder 16 is applied to the wheel cylinders 11 to 14.

If the determination at the step 200 is YES indicating that the stop switch 29 is in an ON state, that is, a driver has possessed the brake pedal 27, the process proceeds to step 210 to determine whether the control-mode flag is set or reset. When the braking operation starts, the control-mode flag is reset at step 202 as described earlier. Thus, a NO determination at step 210 causes the flow to proceed to step 212 to determine whether or not the vehicle speed VB is higher than a predetermined vehicle speed KVB0 (for example 8 km/h), a criterion for determining whether or not antiskid control is required. When the vehicle speed VB is higher than the predetermined vehicle speed KVB0, the flow of processing proceeds to a step 214 to determine whether or not the slip ratio SW is greater than a predetermined value KS0(for example 20%). Right after the start of the braking operation, however, a slip hardly occurs, requiring no antiskid control. Thus, a NO determination at step 214 causes the flow of processing to proceed to step 204 to get in the continuous pressure increasing mode by way of the step 202. When the vehicle speed VB is not higher than the predetermined vehicle speed KVB0 (VB≦KVB0), the flow of processing also proceeds to step 204 by way of step 202.

By continuing the braking operation in the continuous pressure increasing mode established at the step 204, the slip ratio SW increases and eventually exceeds the predetermined value KS0(SW>KS0). In this case, a YES determination at step 214 causes the flow of processing to go on to step 220 of the continuation flowchart shown in FIG. 4 at which the control-mode flag is set to indicate that antiskid control is being executed. The process then proceeds to step 222 to determine whether or not the vehicle speed VB is higher than a predetermined vehicle speed KVB1 (for example 4 km/h), a criterion for determining whether or not antiskid control can be executed. In the early stage of the braking operation, the vehicle speed VB is higher than a predetermined vehicle speed KVB1. Thus, the determination at the step 222 is YES, causing the flow of processing to proceed to step 224 to determine whether or not the slip ratio SW is greater than another predetermined value KS1 (for example 15%), another criterion for selecting one of control modes in antiskid control. When the determination at step 224 is made for the first time, the determination therein is normally YES. Therefore, the flow of processing continues to step 226 to determine whether or not the wheel acceleration dVW is equal to or smaller than 0 G (dVW≦0 G), indicating that the slip ratio of the wheel is increasing. If the determination at the step 226 is YES, the flow of processing goes on to step 228 to begin a pressure-decreasing mode. If the determination at step 226 is NO, on the other hand, the flow of processing goes on to step 230 to begin a pressure-holding mode. In either case, the flow of processing returns to the main routine shown in FIG. 2.

The pressure decreasing mode is a mode of antiskid control in which a pressure holding output to maintain the brake pressure and a pressure decreasing output to decrease the brake pressure are alternately and repeatedly provided from the electronic control unit 50 at intervals of for example 15 ms. On the other hand, the pressure holding mode is a mode of antiskid control in which the pressure holding output is provided from the electronic control unit 50 continuously. When the wheel acceleration dVW is equal to or smaller than 0 G (dVW≦0 G), indicating that the slip ratio of the wheel is increasing, the pressure decreasing mode is established at step 228 to gradually decrease the hydraulic pressure (or the brake pressure) applied to the wheel cylinder 11 to 14. When the acceleration dVW turns positive (dVW>0 G), that is, when the slip ratio will be gradually decreasing, the determination at step 226 is NO, causing the pressure holding mode to be established at step 230. It should be noted that, in either case, when processing eventually returns to step 210 of the flowchart shown in FIG. 3 by way of the processing shown in FIG. 2, since the control-mode flag has already been set at the step 220, the processing proceeds from the step 210 directly to the step 220 of the flowchart shown in FIG. 4.

As a result of carrying out the processing described above repeatedly, when the slip ratio SW becomes equal to or smaller than the predetermined value KS1 and the determination at step 224 is NO, or when the vehicle speed VB becomes equal to or smaller than the predetermined value KVB1 and the determination at step 222 is NO, flow of processing proceeds to step 232. In step 232, it is determined whether or not a pressure-increasing pulse pattern in a pulse pressure increasing mode has been completed. When the determination is made at step 232 for the first time, the pulse pattern has not yet started and, thus, the determination thereof is NO, causing the flow of processing to continue to step 234. At step 234, the pulse pressure increasing mode is established to carry out processing represented by a flowchart shown in FIG. 5.

Figure 5:
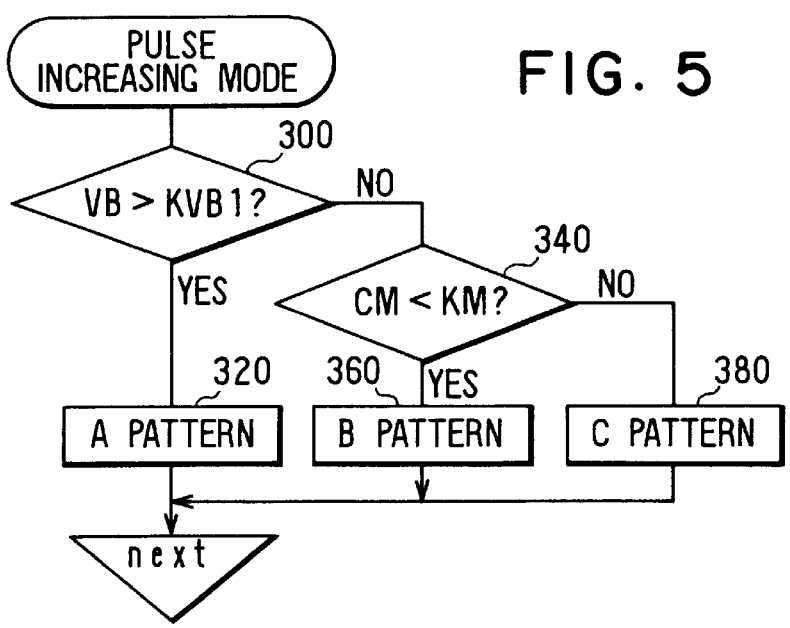
FIG. 5 is a flowchart representing processing in a pulse pressure increasing mode.
Figure 7:
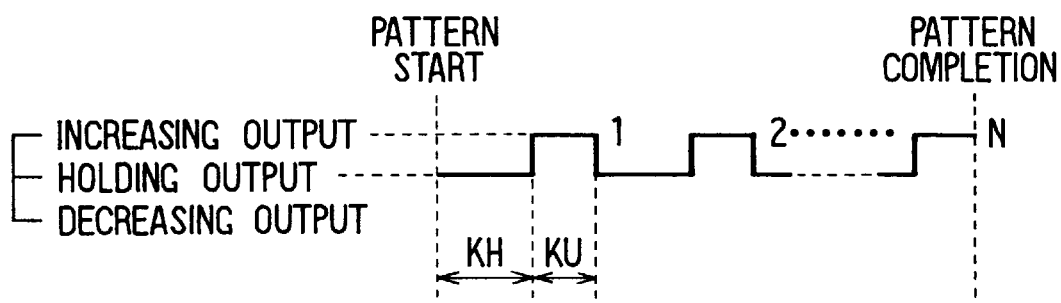
FIG. 7 is a time chart of an output signal generated to control the brake pressure in the pulse pressure increasing mode.

FIG. 5 is a flowchart representing processing which is carried out to select one of the three pulse patterns in the pulse pressure increasing mode. As shown in FIG. 5, the flowchart begins with step 300 to determine as to whether or not the vehicle speed VB is higher than the predetermined value KVB1 (VB>KVB1). When the determination at the step 300 is YES, the flow of processing goes on to step 320 at which a pulse pattern "A" of the pulse pressure increasing mode is set, and then returns to the main routine shown in FIG. 2. The pulse pressure increasing mode is a mode in which the pressure increasing output and the pressure holding output are alternately and repeatedly provided as illustrated in FIG. 7. The pulse pressure increasing mode has three pulse patterns A, B, and C. In each of three pulse patterns A, B, and C, a continuous time KH of pressure-holding output, a continuous time KU of pressure-increasing output, and a number of pulses are set as shown in Table 1.

TABLE 1

| | Pulse pattern | | |
|---|---|---|---|
| | A | B | C |
| KU | 3 ms | 5 ms | 6 ms |
| KH | 100 ms | 100 ms | 60 ms |
| N | 5 p | 15 p | 10 p |

When pulse pattern A of Table 1 is set at step 320, the pressure holding output (100 ms) and the pressure-increasing output (3 ms) are alternately provided by the electronic control unit 50. The sequence of the pressure holding output and the pressure increasing output is repeated five times. In the pulse pressure increasing mode, when the slip ratio SW increases and exceeds the predetermined value KS1 (SW>KS1), the determination at the step 224 of the flowchart shown in FIG. 4 turns to YES. In this case, the flow of processing proceeds to step 228 to enter the pressure decreasing mode or to step 230 to enter the pressure sustaining mode as described earlier, to reduce the slip ratio SW of the wheel. When all of the pulses according to one of the three pulse patterns of the pulse pressure increasing mode are outputted without the slip ratio SW exceeding the predetermined value KS1, the determination at the step 232 at this time YES. Therefore, the flow of processing proceeds to the step 204 to return to the continuous pressure increasing mode by way of the step 202 at which the control-mode flag is reset to indicate that antiskid control is not being executed.

When the vehicle speed VB becomes equal to or lower than the predetermined value KVB1 (VB≦KVB1), a necessary condition for establishing the pulse pressure increasing mode is satisfied and the flow of processing proceeds to step 234 by way of step 232. In this case, the determination at step 300 is also NO because the vehicle speed VB is equal to or lower than the predetermined value KVB1 (VB≦KVB1), causing the flow of processing to proceed to step 340 to determine whether or not the value of a counter memory CM to be described later is smaller than a predetermined value KM (CM<KM). If the determination at step 340 is YES, indicating that the value of the counter memory CM is smaller than the predetermined value KM (CM<KM), the flow of processing proceeds to step 360. In step 360, the B pulse pattern of the pulse pressure increasing mode is set and then returns to the main routine shown in FIG. 2. If the determination at the step 340 is NO, indicating that the value of the counter memory CM is equal to or greater than the predetermined value KM (CM≧KM), the flow of processing goes on to step 380. In step 380, the C pulse pattern of the pulse pressure increasing mode is set and then returns to the main routine shown in FIG. 2.

Figure 6:
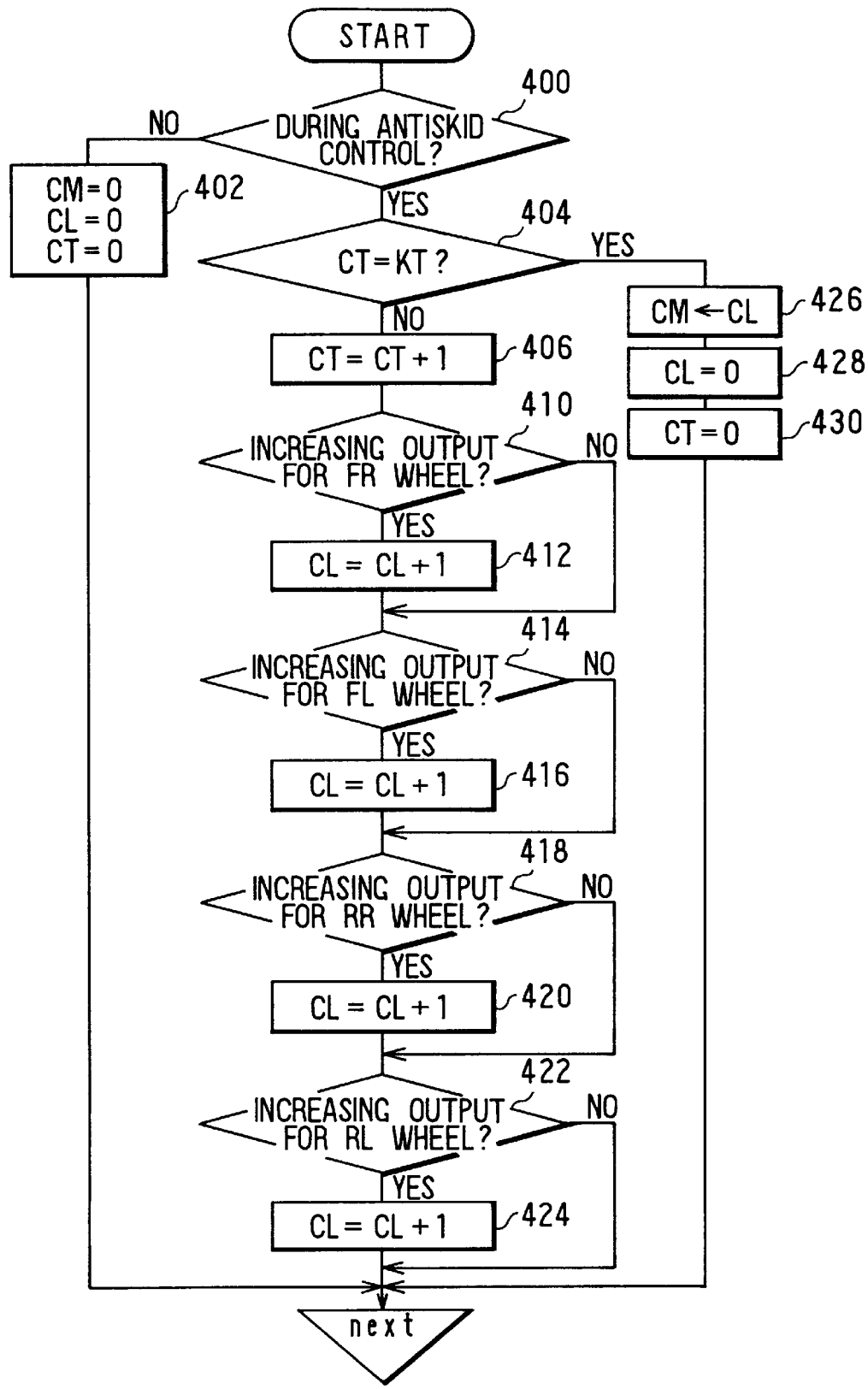
FIG. 6 is a flowchart of a routine for estimating the speed of an operation carried out on a brake pedal.

FIG. 6 is a flowchart of a routine for estimating the speed of an operation carried out on the brake pedal 27. The routine is executed as a routine separate from the routines described so far by the electronic control unit 50 repeatedly at predetermined intervals to set the value of the counter memory CM cited above. To put it in detail, as a result of execution of this processing, the value of the counter memory CM is set at a value representing the speed of an operation carried out on the brake pedal 27.

As shown in FIG. 6, the flowchart begins with step 400 to determine as to whether or not antiskid control is being executed. Whether or not antiskid control is being executed is determined based on the status of the control mode flag. That is, when the control mode flag is set, then antiskid control is being executed. If the determination at the step 400 is NO, the flow of processing goes on to step 402. At step 402, the values of the counter memory CM, a total-pressure-increasing-time counter CL and the gate-time counter CT are each reset to a zero and the processing is terminated.

If the determination at the step 400 is YES, on the other hand, the flow of processing goes on to a step 404. At step 404, it is determined whether or not the value of the gate-time counter CT is equal to a predetermined value KT. Since the initial value of the gate-time counter CT is zero, the determination at the step 404 for the first time is NO, causing the flow of processing to proceed to step 406. At the step 406, the value of the gate-time counter CT is incremented by one. The flow of processing then proceeds to step 410 to determine whether or not a pressure increasing output to increase the hydraulic pressure applied to the wheel cylinder 11 of the front right (FR) wheel 1 is being provided. If the determination at the step 410 is YES, the flow of processing continues to step 412. At step 412, the value of the total-pressure-increasing-time counter CL is incremented by one and then the processing proceeds to step 414. If the determination at the step 410 is NO, on the other hand, the flow of processing continues directly to step 414, skipping the step 412.

The same processing as the processing of the steps 410 and 412 is carried out for each of the front left wheel (FL wheel) 2, rear right wheel (RR wheel) 3 and rear left wheel (RL wheel) 4 in steps 414 through 424. That is, it is determined whether or not the pressure increasing output is being provided to the respective wheel cylinders 12 to 14 of the wheels 2 to 4 (steps 414, 418, 422). When the determinations at steps 414, 418 and 424 are YES, the value of the total-pressure-increasing-time counter CL is incremented by one at the steps 416, 420 and 424 respectively. After the processing is carried out at the step 422 and/or step 424, the routine is completed. As the result that this routine is executed repeatedly, the determination at the step 404 becomes YES, indicating CT=KT. In this case, the flow of processing thus goes on to step 426 at which the value of the total-pressure-increasing-time counter CL is copied to the counter memory CM. Then, the flow of processing proceeds to a step 428 at which the value of the total-pressure-increasing-time counter CL is cleared to zero. At step 430, the value of the gate time counter CT is reset to a zero to end the processing.

By executing the processing represented by the flowchart shown in FIG. 6, a value set in the counter memory CM is equal to the number of pressure increasing outputs provided from the electronic control unit 50 during a period of time equal to the product of the execution time of the routine of FIG. 6 and the predetermined value KT. As a result, the value set in the counter memory CM represents the speed of the operation carried out on the brake pedal 27, that is, the speed of the movement of the brake pedal 27.

Returning to FIG. 5, if the determination at the step 340 is YES, indicating that the value of the counter memory CM is smaller than the predetermined value KM (CM<KM), the flow of processing goes on to the step 360. In the step 360, the B pulse pattern of the pulse pressure increasing mode is set in order to increase the hydraulic pressure in a relatively gradual manner. If the determination at the step 340 is NO, indicating that the value of the counter memory CM is equal to or greater than the predetermined value KM (CM≧KM), the flow of processing goes on to step 380. In step 380, the C pulse pattern of the pulse pressure increasing mode is set in order to increase the hydraulic pressure in a relatively abrupt manner.

In this way, for a vehicle speed VB equal to or lower than the predetermined value KVB1, the antiskid control apparatus provided by the present invention is capable of setting a pulse pattern of the pulse pressure increasing mode corresponding to the speed of the movement of the brake pedal 27 to increase the brake pressure which is attained just before the vehicle speed VB becomes equal to or lower than the predetermined value KVB1. That is, the present invention provides a comparatively gentle B pulse pattern for a low speed of an operation carried out by the driver on the brake pedal or comparatively abrupt C pulse pattern for a high speed of the operation carried out on the brake pedal. As a result, the amounts of brake fluid (or hydraulic-pressure fluid) flowing out from the master cylinder 16, that is, the speeds of the movement of the brake pedal 27, which are attained before and after the vehicle speed VB becomes equal to or lower than the predetermined value KVB1 are made close to each other to give an effect of suppressing changes with time in amount of brake fluid flowing out from the master cylinder 16, that is, changes with time in brake-pedal operation speed. For this reason, the brake-pedal operation feedback to the driver is not unacceptable even at low speeds, giving no sense of incompatibility or inconsistency in the pedal feedback to the driver.

Figure 8A:
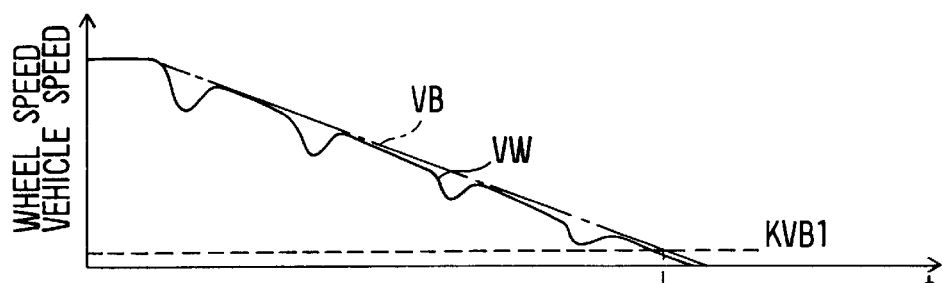
FIGS. 8A to 8E are time charts for illustrating the effects of the processing carried out by the first embodiment.
Figure 8B:
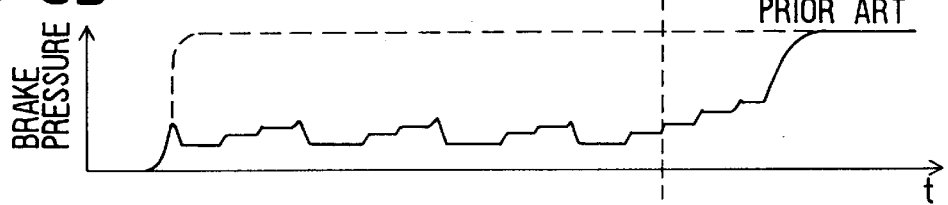
Figure 8C:
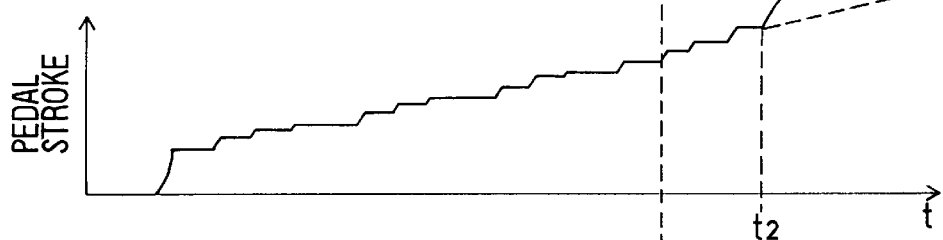
Figure 8D:
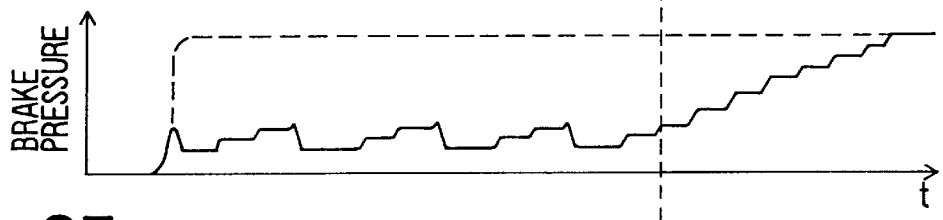
Figure 8E:
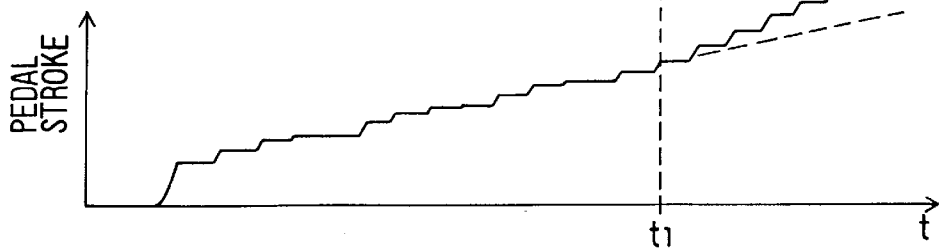
Figure 10A:
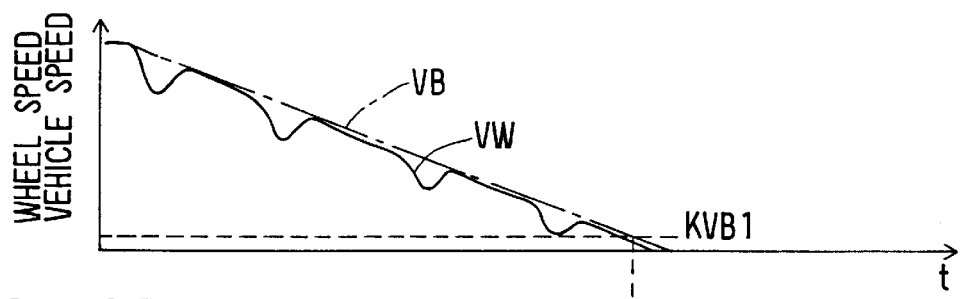
FIGS. 10A to 10E are time charts for explaining effects of the processing carried out by the second embodiment in a pulse pressure increasing mode.
Figure 10B:
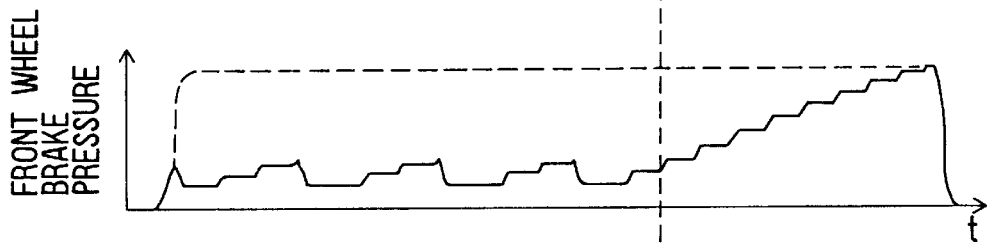
Figure 10C:
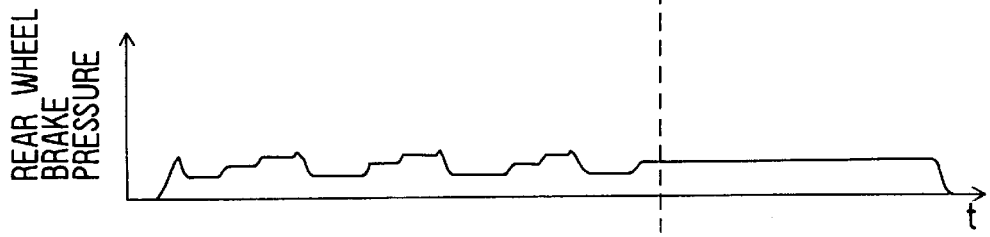
Figure 10D:
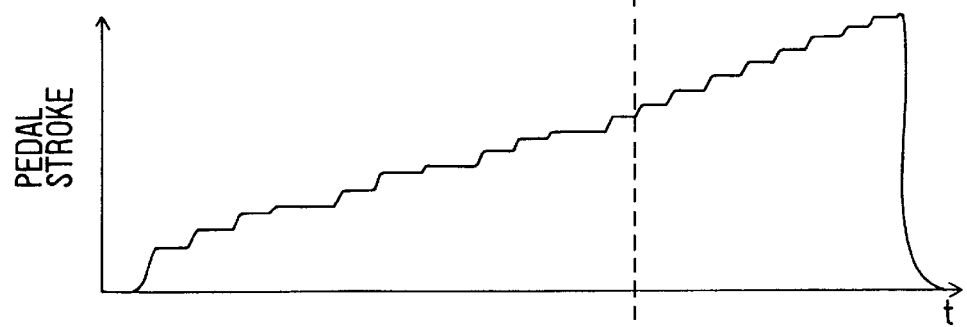
Figure 10E:
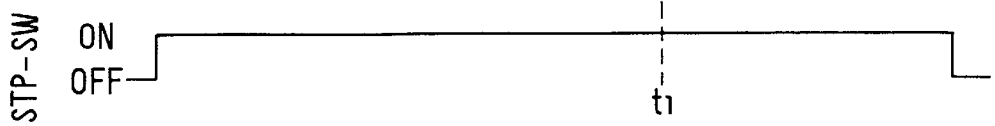

Next, the effect of the processing is described by referring to time charts shown in FIGS. 8A to 8E. For comparison purposes, the description includes explanation of the conventional antiskid control apparatus wherein the (pulse) pressure increasing mode is forcibly set when the vehicle speed VB becomes equal to or lower than the predetermined value KVB1. It should be noted that FIG. 8A shows a time chart of the wheel speed VW and the vehicle speed VB. FIGS. 8B and 8C respectively show time charts of the brake pressure and the pedal stroke of the conventional antiskid control apparatus for the changes in wheel speed VW and in vehicle speed VB shown in FIG. 8A. FIGS. 8D and 8E respectively show time charts of the brake pressure and the pedal stroke of the antiskid control apparatus provided by the present embodiment for the changes in wheel speed VW and in vehicle speed VB shown in FIG. 8A.

Up to a time the vehicle speed VB becomes equal to or lower than the predetermined value KVB1, the conventional antiskid control apparatus and the antiskid control apparatus of the present embodiment exhibit behaviors similar to each other as far as the brake pressure and the pedal stroke are concerned. To put it in detail, the following behavior is repeated. The brake pressure is adjusted in the continuous pressure increasing mode initially. When a slip occurs, a transition to a pressure decreasing mode happens and, when the wheel speed VW starts increasing, a transition to a pressure holding mode takes place. As the magnitude of the slip is gradually reduced, a transition to a pulse pressure increasing mode takes place and when the magnitude of the slip increases again, on the other hand, a transition back to the pressure decreasing mode takes place. In the mean time, the pedal stroke is step-wisely increased each time the pressure increasing output is provided from the electronic control unit 50.

Assume that the vehicle speed VB reaches the predetermined value KVB1 at a point of time t1 and that, in the example shown in FIGS. 8A to 8E, the brake pressure is increased in accordance with the A pulse pattern in the pulse pressure increasing mode at the point of time t1. In the case of the conventional antiskid apparatus shown in FIGS. 8B and 8C, the pulse pressure increasing mode currently being implemented is terminated at a point of time t2 because the output of the pulse pattern is completed, resulting a transition to a continuous pressure increasing mode. As a result, the brake pressure and the pedal stroke increase abruptly at the point of time 2, inadvertently causing the driver to feel a sense of inconsistency in the feedback from the brake pedal.

In the case of the antiskid control apparatus provided by the present embodiment as shown in FIGS. 8D and 8E, on the other hand, when the vehicle speed VB reaches the predetermined value KVB1 at the point of time t1, the B or C pulse pattern in the pulse pressure increasing mode is established at the step 360 or 380 of the flowchart shown in FIG. 5 respectively. Since the B or C pulse pattern continues for a sufficiently long time of at least 660 ms, the brake pressure and the pedal stroke increase at a fixed gradient until the brake pressure reaches the master cylinder pressure. In addition, since either the B or C pulse pattern is selected at the step 340 depending on whether the value of the counter memory CM is smaller than the predetermined value KM, the gradient of the change with time in pedal stroke is very close to the gradient exhibited prior to the point of time t1. As a result, the antiskid control apparatus provided by the present embodiment provides almost no sense of incompatibility or inconsistency to the driver, allowing the vehicle to be stopped safely.

Next, a pulse pressure increasing mode provided by a second embodiment of the present invention is explained. It should be noted that the antiskid control apparatus provided by the second embodiment has the same configuration, the same main routine and the same routines of processing to select an operating mode as those shown in FIGS. 1 to 4. However, the routine shown in FIG. 6 for estimating the speed of movement of a brake pedal is not executed. In addition, pulse patterns adopted in the pulse pressure increasing mode in the present embodiment are shown in Table 2 in place of Table 1.

TABLE 2

| | Pulse pattern | | |
|---|---|---|---|
| | A | B | C |
| KU | 3 ms | 5 ms | 0 ms |
| KH | 100 ms | 100 ms | 100 ms |
| N | 5 p | 15 p | 20 p |

As shown in Table 2, the A and B pulse patterns are the same as those shown in Table 1 for the first embodiment. As for the C pulse pattern, KU=0 ms, KH=100 ms and N=20 p. That is, no pressure increasing output is provided and a pressure holding output to maintain the hydraulic pressure is provided continuously for 2 seconds (=100 ms×20).

Figure 9:
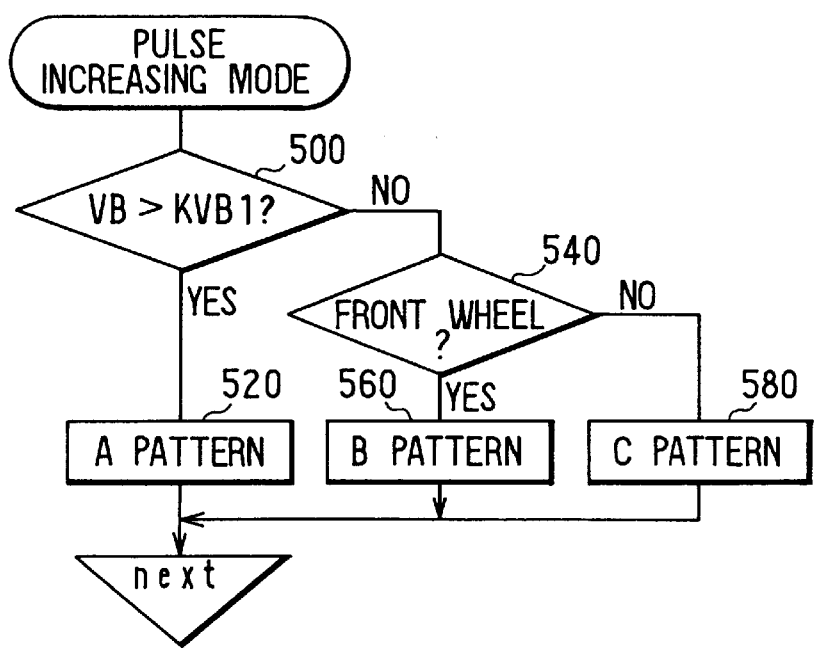
FIG. 9 is a flowchart representing processing carried out by a second embodiment in a pulse pressure increasing mode.

In the course of antiskid control, much like the first embodiment, when the vehicle speed VB becomes equal to or lower than the predetermined value KVB1 (VB≦KVB1), resulting in a NO determination at step 222 of the flowchart shown in FIG. 4 or the slip ratio SW becomes equal to or smaller than the predetermined value KS1 (SW≦KS1), resulting in a NO determination at step 224 of the same flowchart, the flow of processing may go on to the step 234 by way of step 232. In this case, the processing in a pulse pressure increasing mode shown in FIG. 9 is carried out. If the vehicle speed VB is found to be higher than the predetermined value KVB1 (VB>KVB1) at step 500, that is, if the determination at step 500 is YES, the A pulse pattern of the pulse pressure increasing mode is set and then processing returns to the main routine as is the case with the first embodiment.

In the second embodiment, however, if the vehicle speed VB is found to be equal to or lower than the predetermined value KVB1 (VB≦KVB1) at step 500, that is, if the determination at step 500 is NO, the flow of processing goes on to step 540. In step 540, it is determined whether or not the wheel being controlled is either one of the front right wheel 1 and the front left wheel 2. If the wheel being controlled is either one the front right wheel 1 and the front left wheel 2, the flow of processing proceeds to step 560 which sets the B pulse pattern of the pulse pressure increasing mode and then returns to the main routine. If the wheel being controlled is either the rear right wheel 3 or the rear left wheel 4, the flow of processing proceeds to step 580 which sets the C pulse pattern of the pulse pressure increasing mode and then returns to the main routine. With the control scheme described above, the way of increasing the brake pressures applied to the front right wheel 1 and the front left wheel 2 can be made different from the rear right wheel 3 and the rear left wheel 4.

The effect of the processing described above is exemplified by using time charts shown in FIGS. 10A to 10E. At a point of time t1, the vehicle speed VB becomes equal to or lower than the predetermined value KB1. Up to the point of time t1, the brake pressures applied to the front and rear wheels and the pedal stroke change in the same way as those shown in FIGS. 8D and 8E. At the point of time t1, the vehicle speed VB becomes equal to or lower than the predetermined value KVB1, resulting in a YES determination at step 500. In this case, the brake pressures applied to the front wheels are gradually increased in accordance with the B pulse pattern of the pulse pressure increasing mode while the brake pressures applied to the rear wheels are maintained for two seconds in accordance with the C pulse pattern of the pulse pressure increasing mode. In addition, normally, the braking operation carried out on the brake pedal is terminated in that time period.

As described above, in the second embodiment, when the vehicle speed VB becomes equal to or lower than the predetermined value KVB1 as a result of a braking operation, only the brake pressures applied to the front wheels 1 and 2 are gradually increased while the brake pressures applied to the rear wheels 3 and 4 are maintained. Thus, brake fluid flows out from the master cylinder 16 to only the wheel cylinders 11 and 12. As a result, even if the pulse pressure increasing mode is continued, the magnitude of the pedal stroke of the brake pedal 27 is reduced by half to give no sense of incompatibility or inconsistency to the driver.

It should be noted that, while the present invention is described with reference to the first and second preferred embodiments, the explanation is not intended to be construed in a limiting sense. That is, a variety of changes and modifications can be made to the embodiments without departing from the true spirit and scope of the present invention. For example, in the processing represented by the flowchart shown in FIG. 9, the brake pressures applied to the rear wheels 3 and 4 are maintained. However, by merely making the timing to increase the brake pressures applied to the front wheels different from the timing to increase the brake pressures applied to the rear wheels, the same effect can also be expected. By the same token, the timing to increase the brake pressure applied to the hydraulic pressure system on the right side of FIG. 1 (or the front left wheel 2 and the rear right wheel 3) can also be made different from the timing to increase the brake pressure applied to the hydraulic pressure system on the left side of FIG. 1 (or the front right wheel 1 and the rear left wheel 4). In addition, the timings to increase the brake pressures applied to the four individual wheels can be made different from each other as well. Furthermore, with different timings to apply brake pressures to the wheels, the speed (pressure increasing gradient) at which the brake pressure is increased can be set at a value determined by the value of the counter memory CM of the flowchart shown in FIG. 6. As a result, the antiskid control apparatus provided by the present embodiment allows the vehicle to be stopped safely without providing a sense of incompatibility or inconsistency to the driver.

As described above, the antiskid control apparatus is not provided with a pressure source other than the master cylinder 16. It should be noted, however, that the present invention can also be applied to an antiskid control apparatus further having a hydraulic-pressure generating source such as a pump in addition to the master cylinder 16. In the case of an antiskid control apparatus having a pressure source other than the master cylinder 16, there is observed the so-called kickback, a phenomenon in which the brake pedal is pushed back during a braking operation. As a result, the driver does not feel to the same degree inconsistency in the pedal feedback even if the brake-pedal operation feeling changes. In an antiskid control apparatus having the master cylinder as a sole pressure source, however, the kickback does not occur. For this reason, when an antiskid control apparatus has the master cylinder as a sole pressure source, the driver feels a strong a sense of incompatibility accompanying a change in feedback from the brake pedal during a brake-pedal operation. Therefore, there is strong demand for preventing the brake-pedal operation feedback from becoming less desirable.

In the antiskid control apparatuses each having the master cylinder 16 as a sole pressure generator as described by the embodiments, however, the brake-pedal operation feedback can be prevented from becoming unacceptable, making the effects of the present invention even more remarkable. In addition, since the embodiments do not require a pressure source such as a pump other than the master cylinder 16, the antiskid control apparatus can be manufactured at an even lower cost and also allows the amount of noise generated thereby to be reduced.

Figure 11:
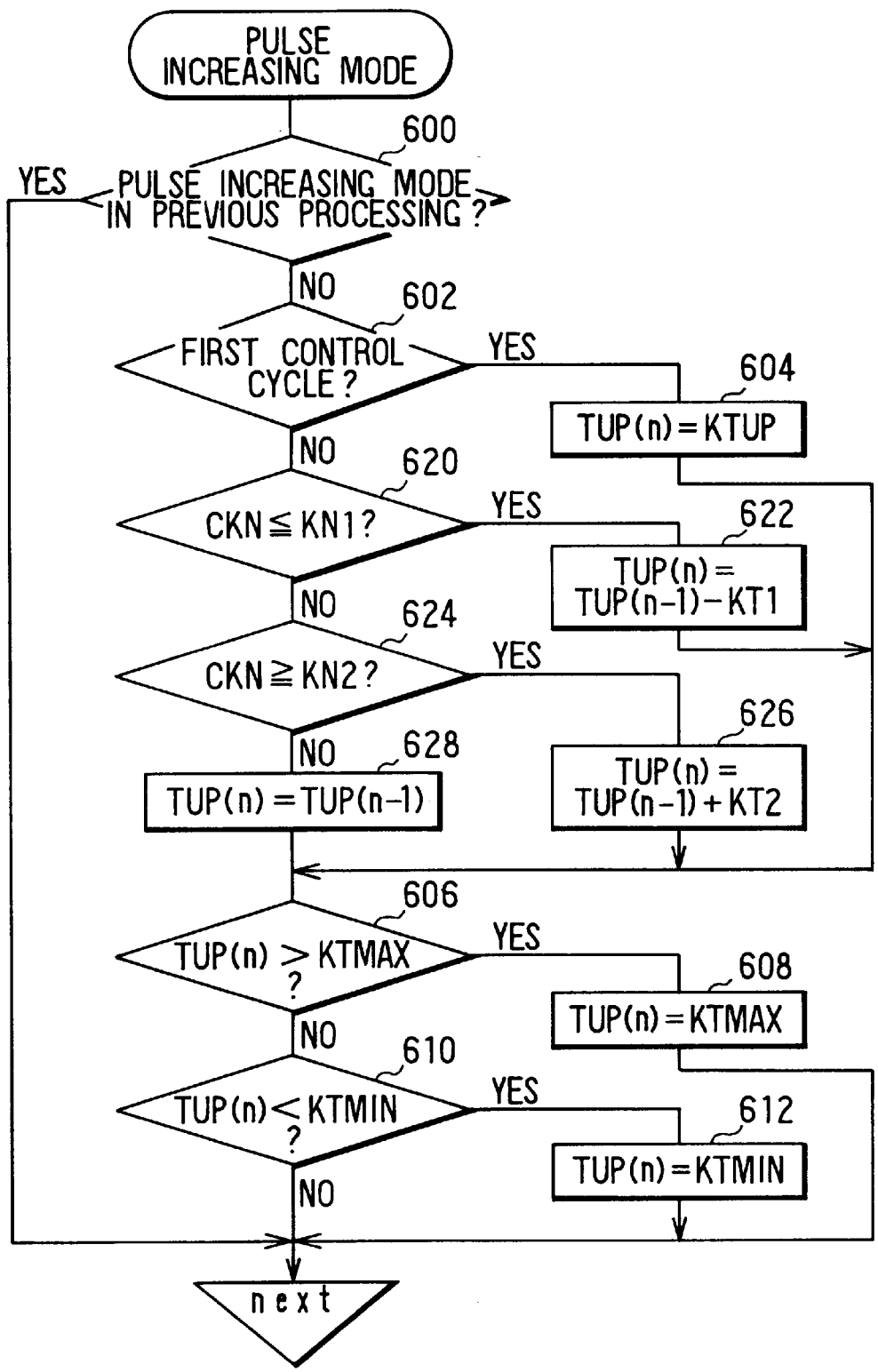
FIG. 11 is a flowchart representing processing carried out by a third embodiment in a pulse pressure increasing mode.

Next, the processing for a pulse pressure increasing mode provided by a third embodiment of the present invention is explained by referring to a flowchart shown in FIG. 11. It should be noted that the antiskid control apparatus provided by the third embodiment has the same configuration, the same main routine and the same routines of processing to select an operating mode as those shown in FIGS. 1 to 4. However, the routine shown in FIG. 6 for estimating the speed of movement of a brake pedal is not executed.

As shown in FIG. 11, the flowchart for the pulse pressure increasing mode begins with step 600 to determine whether or not the pulse pressure increasing mode has been set in a previous processing (that is, whether or not the current pulse pressure increasing mode is a newly started one). When this routine is executed for the first time, the execution of a pulse pressure increasing mode is initiated, resulting in a NO determination at the step 600. In this case, the flow of processing thus proceeds to step 602 to determine whether or not the current pulse pressure increasing mode is carried out within a first control cycle of antiskid control. It is to be noted that one control cycle of antiskid control is composed of a pressure decreasing mode, a pressure holding mode and a pressure increasing mode which are successively performed. If the determination at the step 602 is YES, the flow of processing proceeds to step 604. At step 604, TUP(n), the current value of the pulse duration TUP of the pulse pressure increasing mode, is set at a predetermined value KTUP (for example 4 ms), which has been determined in advance. The flow of processing then continues to step 606.

Here, the pulse pressure increasing mode is a mode in which the pressure holding output and the pressure increasing output are provided from the electronic control unit 50 alternately and repeatedly as shown in FIG. 12. In addition, in the case of the second embodiment, the pulse pattern of the pulse pressure increasing mode is divided into a first-half pulse pattern and a latter-half pulse pattern. A continuous time KH of the pressure holding output, a continuous time TUP of the pressure increasing output and the number of pulses N for each of the first-half pulse pattern and the latter-half pulse pattern are shown in Table 3. As shown in the table, the value of the continuous time TUP of the pressure increasing output is dynamically determined in the processing of FIG. 11 for the pulse pressure increasing mode.

TABLE 3

|  | First-half pulse pattern | Latter-half pulse pattern |
| --- | --- | --- |
| Tup | Determined in processing for pulse pressure increasing mode | |
| KH | 400 ms | 100 ms |
| N | Up to 3 pulses | 6 p |

The first-half pulse pattern includes up to three pulses for increasing the brake pressure. With the current value of the continuous time TUP(n) of the pressure increasing output set at the predetermined value KTUP, for example, in the first-half pulse pattern, the pressure holding output of 400 ms and the pressure increasing output of the predetermined value KTUP followed thereby are alternately repeated three times. The first-half pulse pattern is followed by the latter-half pulse pattern. In the latter-half pulse pattern, the pressure holding output of 100 ms and the pressure increasing output of the predetermined value KTUP are alternately repeated six times.

The processing from step 606 to step 612 is for altering the value of TUP (n) so that the value of TUP(n) falls within a range from an upper limit KTMAX (for example 12 ms) to a lower limit KTMIN (for example 2 ms). That is, in the step 606, it is determined whether or not the value of TUP(n) is greater than the upper limit KTMAX. If the value of TUP(n) is greater than the upper limit KTMAX, the flow of processing proceeds to step 608 at which the value of TUP(n) is set at the upper limit KTMAX. If the value of TUP(n) is not greater than the upper limit KTMAX, on the other hand, the flow of processing proceeds to step 610. In the step 610, it is determined whether or not the value of TUP(n) is smaller than the lower limit KTMIN. If the value of TUP(n) is smaller than the lower limit KTMIN, the flow of processing proceeds to step 612 at which the value of TUP(n) is set at the lower limit KTMIN. If the value of TUP(n) is not smaller than the lower limit KTMIN, on the other hand, the flow of processing returns to the main routine. In other words, if the value of TUP(n) is found not greater than the upper limit KTMAX at the step 606 and not smaller than the lower limit KTMIN at the step 610, the processing is returned to the main routine without altering the value of TUP(n).

Much like the first embodiment, after antiskid control is executed, when the slip ratio SW becomes equal to or smaller than the predetermined value KS1 (SW≦KS1) for the first time, the pulse pressure increasing mode is carried out at step 234 of the flowchart in FIG. 4 while the value of TUP(n) is set at the predetermined value KTUP. When the routine shown in FIG. 11 is executed again later, the pulse pressure increasing mode has been already carried out. In this case, the determination at the step 600 is thus NO. As a result, the flow of processing returns to the main routine to continue the pulse pressure increasing mode without changing the value of TUP(n).

Then, while the pulse pressure increasing mode is continued, if the slip ratio SW becomes greater than the predetermined value KS1 (SW>KS1), the pulse pattern of the pulse pressure increasing mode is suspended, being replaced by a pressure decreasing mode at the step 228 or a pressure holding mode at the step 230 as is the case with the first embodiment. In addition, at that time, the number of pulses in the pulse pattern which have been outputted to increase the brake pressure is stored in a RAM counter CKN.

If the output of the pulse pattern of the pulse pressure increasing mode has been completed without the slip ratio SW becoming greater than the predetermined value KS1, the determination at the step 232 is YES. At this time, the number of all the pulses in the first-half and latter-half patterns is stored in the RAM counter CKN. The flow of processing goes on to step 204 to begin the continuous pressure increasing mode by way of the step 202 at which the control-mode flag is reset.

When the slip ratio SW again becomes equal to or smaller than the predetermined value KS1 (SW≦KS1) after the RAM counter CKN have stored the number of pulses in the pulse pattern, the flow of processing proceeds to the step 234 by way of the step 232. As described above, the processing in the pulse pressure increasing mode begins with step 600 of the flowchart shown in FIG. 11. In this case, since the determination at step 600 is NO because the pulse pressure increasing mode was just started and the determination at the step 602 is also NO because pressure control (decreasing, holding and increasing) in the first control cycle has been already performed, the flow of processing goes on to step 620. At step 620, the value of the RAM counter CKN is compared with a reference value KN1 (for example 1) in order to determine whether or not the former is equal to or smaller than the latter (CKN≦KN1). If the value of the RAM counter CKN is found equal to or smaller than the reference value KN1, the flow of processing continues to step 622. In step 622, a value obtained by subtracting a predetermined value KT1 (for example 0.5 ms) from TUP(n−1) which is the previous value of TUP is used as TUP(n), the current value of TUP.

The flow of processing then proceeds to step 606 described earlier.

If the value of the RAM counter CKN is found greater than the reference value KN1 (CKN>KN1), on the other hand, the flow of processing goes on to step 624. At step 624, the value of the RAM counter CKN is compared with another reference value KN2 (for example 4) in order to determine whether or not the former is equal to or greater than the latter (CKN≧KN2). If the value of the RAM counter CKN is found equal to or greater than the reference value KN2, the flow of processing continues to step 626 at which a value obtained by adding a predetermined value KT2 (for example 1 ms) to TUP(n−1) which is the previous value of TUP is used as TUP(n), the current value of TUP. The flow of processing then proceeds to step 606 described earlier. If the value of the RAM counter CKN is found smaller than the reference value KN2 (CKN<KN2), on the other hand, the flow of processing goes on to step 628. At step 628, the value of TUP(n−1) which is the previous value of TUP is used as TUP(n), the current value of TUP. The flow of processing then proceeds to step 606. After completing the processing at step 606 to step 612, the flow of processing returns to the main routine.

As described above, in the antiskid control apparatus provided by the third embodiment, when $CKN \leq KN1$, the value of TUP is reduced so that pressure increasing amount per one pressure increasing output decreases (step 622). When $CKN \geq KN2$, on the other hand, the value of TUP is increased so that pressure-increasing amount per one pressure increasing output increases (step 626). As a result of the correction of the value of TUP, the number of pulses outputted in the pulse pressure increasing mode is adjusted to a value in a predetermined range, that is, the range of 2 to 3 pulses in the third embodiment.

Next, effects of the above described processing are explained by referring to time charts shown in FIGS. 13A to 13D and 14A to 14D. It should be noted that the time charts shown in FIGS. 13A to 13D and 14A to 14D represent changes with time in wheel speed VW, vehicle speed VB, brake pressure, stroke of the brake pedal 27 and the value of TUP. The changes with time in brake pressure are shown along with changes with time in force of stepping on the brake pedal 27 which are represented by dashed lines in FIGS. 13B and 14B. In addition, in the following description, as a variety of constants such as KTUP, numbers enclosed in parentheses are used.

As shown in FIGS. 13A to 13D, when the slip ratio SW becomes small to a certain degree at a point of time t0 after the start of a braking operation, a transition to a pulse pressure increasing mode takes place. At this time, the continuous time TUP of the pressure increasing output is set at the predetermined value KTUP. Before a point of time t1 at which the force of stepping on the brake pedal is reduced, three pulses having the continuous time TUP are outputted in the pulse pressure increasing mode before transition to a pressure decreasing mode. Therefore, the value of TUP is held constant. When the force of stepping on the brake pedal is reduced at the point of time t1, the pressure increasing amount per one pulse (one pressure increasing output) decreases. For this reason, the slip ratio SW does not increase much and the pulse pressure increasing mode is continued to the latter-half pulse pattern. When the transition to the latter-half pulse pattern takes place, the frequency of the pulses to raise the brake pressure increases as shown in Table 3. At that time, the slip ratio SW increases abruptly, resulting in transition to the pressure decreasing mode. In the example shown in FIG. 13B, six pulses to raise the brake pressure are outputted during such a time period.

For this reason, at a point of time t2 at which a transition to a next pulse pressure increasing mode takes place, the value of TUP is corrected to a greater value. As a result, the number of pulses to increase the brake pressure is reduced to four. Since the number of pulses to increase the brake pressure is still large, however, at a point of time t3 at which a transition to a next pulse pressure increasing mode takes place, the value of TUP is further corrected to an even greater value. As a result, the number of pulses to increase the brake pressure decreases to three. At a point of time t4 at which a transition to a next pulse pressure increasing mode takes place, the value of TUP is held as it is. By carrying out the processing described above, it is possible to raise the pressure increasing amount caused by one pressure increasing output when the force of stepping on the brake pedal 27 is reduced. As a result, a good brake-pedal operation feeling can be obtained and the vehicle can be stopped always in a stable way without regard to changes in force of stepping on the brake pedal 27.

FIGS. 14A to 14D show time charts for a case in which the force of stepping on the brake pedal 27 is strengthened in the course of antiskid control. At a point of time t5 at which a transition to a pulse pressure increasing mode takes place, the value of TUP is set at the predetermined value KTUP. At a point of time t6 at which a transition to a next pulse pressure increasing mode takes place, the value of TUP is held as it is because the previous pulse pressure increasing mode was suspended only after three pulses for increasing the brake pressure were outputted. However, when the force of stepping on the brake pedal is strengthened right after the point of time t6, the current pulse pressure increasing mode is terminated after outputting only one pulse for increasing the brake pressure. At that time, the magnitude of the stroke of the brake pedal 27 increases. Therefore, at a point of time t7 at which a transition to a next pulse pressure increasing mode takes place, the value of TUP is corrected to a smaller value. Since the current pulse pressure increasing mode is also terminated after outputting only one pulse for increasing the brake pressure between time t7 and time t8, at a point of time t8 at which a transition to a next pulse pressure increasing mode takes place, the value of TUP is further corrected to an even smaller value. As a result, the current pulse pressure increasing mode is terminated after outputting two pulses to increase the brake pressure. At a point of time t9 at which a transition to a next pulse pressure increasing mode takes place, the value of TUP is held constant.

By carrying out the processing described above, it is possible to reduce the pressure increasing amount caused by one pulse (one pressure increasing output) when the force of stepping on the brake pedal 27 is strengthened. As a result, not only a good brake-pedal operation feeling can be obtained, but also the vehicle can be stopped always in a stable way without regard to changes in force of stepping on the brake pedal 27. In particular, in the antiskid control apparatus provided by the present embodiment, the brake pressure is reduced by discharging brake fluid to the reservoirs 37 and/or 39. Thus, if abrupt increase and decrease of the brake pressure are repeated several times as shown in a period of time t6 to t8, there is possibility that the reservoirs 37 and 39 become full. According to the antiskid control apparatus provided by the present embodiment, the pressure increasing amount in the pulse pressure increasing mode can be set at a proper value, allowing such an undesirable condition to be well avoided. It should be noted that, even in the case of the vehicle running on a road having a low friction coefficient (low-$\mu$), the continuous time TUP of the pressure increasing output in the pulse pressure increasing mode may also be shortened as well. Even in such a case, the vehicle can be successfully stopped by reducing the pressure increasing amount per one pressure increasing output in the same way.

In addition, in the antiskid control apparatus provided by the present embodiment, since the number of the pulses to increase the brake pressure is adjusted to two to three, the pulse pressure increasing mode can be terminated at the end of the first-half pulse pattern without continuing to the latter-half pulse pattern. Therefore, the interval between the successive pressure increasing outputs is about 400 ms. That is, the number of times the brake pressure is increased is about 2.5 times a second. Since the brake pedal 27 also moves at such an interval, the antiskid control apparatus provided by the present embodiment allows the brake-pedal operation feeling to be improved. In particular, in the antiskid control apparatus provided by the present embodiment, the brake fluid flowing out from the master cylinder 16 is supplied to the wheel cylinders as it is in response to the pressure increasing output and the flow of the brake fluid from the master cylinder 16 is stopped at other times. Thus, the effect of setting the number of times the brake pressure is increased at a proper value is directly reflected in the brake-pedal operation feeling. As a result, a more remarkable effect of improving the brake-pedal operation feeling can be obtained.

It should be noted that, while the third embodiment is described with reference to the drawings, the explanation is not intended to be construed in a limiting sense. That is, a variety of changes and modifications can be made to the third embodiment without departing from the true spirit and scope of the present invention. For example, the interval between the successive pressure increasing outputs is set at a fixed value of about 400 ms. However, the interval can be adjusted in accordance with the slip ratio SW to produce 1.5 to 3.5 pulses for increasing the brake pressure per second as a total.

When the interval between the successive pressure increasing outputs is made constant as described in the third embodiment, no processing to adjust the intervals to a proper value is needed. However, the adjustment of the value of TUP is the only means to keep up with variations such as changes in slip ratio SW, changes in force of stepping on the brake pedal and changes in road-surface conditions. That is, when the brake-pressure adjusting unit is used for gradually increasing the brake pressure with a predetermined frequency which is a value within a predetermined range per unit time, the significance of the pressure increasing amount adjusting unit is enhanced.

In addition, in the case of the third embodiment, the pulse pattern of a pulse pressure increasing mode is divided into a first-half pulse pattern and a latter-half pulse pattern. It should be noted, however, that a single fixed pattern can be provided for the entire period of the pulse pressure increasing mode. In the case of the third embodiment wherein the latter-half pattern generates pulses at a relatively high frequency to increase the brake pressure, however, the following effect can be obtained. When the brake pressure is not sufficient as seen at a point just before the point of time t2 shown in FIGS. 13A to 13D, the brake pressure can be rapidly increased in the course of the pulse pressure increasing mode, allowing the vehicle to be stopped safely. If the brake pressure is increased abruptly by pulses in the latter-half pulse pattern as such, however, the brake pedal 27 moves largely in accordance with the increase of the brake pressure, giving a sense of incompatibility to the driver. In order to solve this problem, the pressure increasing mode seeks to be finished by as many pulses of the first-half pulse pattern as possible by adjustment of the value of TUP. As a result, the sense of incompatibility or inconsistency into brake pedal feedback can be reduced satisfactorily. That is, the antiskid control apparatus provided by the third embodiment exhibits an excellent effect of being capable of stopping the vehicle safely without losing the good brake-pedal operation feedback.

In addition, the antiskid control apparatus provided by the third embodiment does not have a pressure source other than the master cylinder 16. It should be noted, however, that the present invention can also be applied to an antiskid control apparatus provided with a pressure source such as a pump other than the master cylinder 16. In the case of the antiskid control apparatus having the pressure source other than the master cylinder, there is observed the so-called kickback, a phenomenon in which the brake pedal is pushed back during a brake operation. As a result, the driver does not feel a sense of incompatibility even if the brake-pedal operation feedback changes. In the antiskid control apparatus having the master cylinder 16 as a sole pressure source, however, the kickback does not occur. For this reason, when the antiskid control apparatus has the master cylinder as a sole pressure generating source, a strong sense of inconsistency accompanying a change in brake-pedal operation feedback is felt. Therefore, there is demand for prevention of unacceptable brake-pedal feedback to a driver.

In the antiskid control apparatuses each having the master cylinder 16 as a sole pressure source as described by the third embodiment, however, the brake-pedal operation feeling can be prevented from worsening, making the effects of the present invention even more remarkable. In addition, since the third embodiment do not require a pressure source other than the master cylinder 16, the antiskid control apparatus can be manufactured at an even lower cost and also allows the amount of noise generated thereby to be reduced.

What is claimed is:

1. An antiskid control apparatus comprising:

slip state detector for detecting slip states of a plurality of wheels upon application of a brake;

a master cylinder which generates hydraulic fluid pressure in response to said brake application;

at least one brake-pressure adjusting actuator for adjusting brake pressures of said plurality of wheels, said at least one brake-pressure adjusting actuator increasing brake pressures of said plurality of wheels by using hydraulic pressure generated by said master cylinder;

a controller for controlling said at least one brake-pressure adjusting actuator, wherein said slip states of said plurality of wheels fall within a predetermined state, said controller controlling said at least one brake-pressure adjusting actuator such that when slowing a vehicle to a speed below a predetermined value due to braking, said at least one brake-pressure adjusting actuator increases the brake pressures applied to said plurality of wheels with timings different from each other.

2. An antiskid control apparatus according to claim 1, wherein said master cylinder is a sole pressure generating source, and said at least one brake-pressure adjusting actuator increases the brake pressures by supplying hydraulic fluid flowing from said master cylinder and decreases or maintains the brake pressure by prohibiting hydraulic fluid from flowing from said master cylinder, said controller controlling said at least one brake pressure adjusting actuator regarding whether to increase, decrease or maintain the brake pressure.

3. An antiskid control apparatus comprising:

a slip state detector for detecting slip states of a plurality of wheels upon application of a brake;

a master cylinder which generates hydraulic fluid pressure in response to said brake application;

at least one brake-pressure adjusting actuator for adjusting brake pressures of said plurality of wheels, said at least one brake-pressure adjusting actuator increasing brake pressures of said plurality of wheels by using hydraulic pressure generated by said master cylinder;

a controller for controlling said at least one brake-pressure adjusting actuator so that said slip states of said plurality of wheels fall within a predetermined state, wherein when slowing a vehicle to a speed below a predetermined value by braking, said controller controls said at least one brake-pressure adjusting actuator to either increase or decrease the brake pressures applied to said plurality of wheels to adjust an amount of fluid flowing from said master cylinder to be approximately equal to an amount of fluid which had been flowing out of said master cylinder just before the speed of the vehicle dropped below said predetermined value.

4. An antiskid control apparatus according to claim 3, wherein said master cylinder is a sole pressure generating source, and said at least one brake-pressure adjusting actuator increases the brake pressures by supplying hydraulic fluid flowing from said master cylinder and decreases or maintains the brake pressures by prohibiting hydraulic fluid from flowing from said master cylinder.

5. An antiskid control apparatus according to claim 3, wherein said controller increases the brake pressures applied to said plurality of wheels using different timings.

6. An antiskid control apparatus according to claim 5, wherein said controller limits a brake pressure increase operation using different timings only when travelling at a speed lower than the predetermined value due to said brake application.

7. An antiskid apparatus comprising:
a slip state detector for detecting slip states of a plurality of wheels upon application of a brake;
a master cylinder which generates hydraulic fluid pressure in response to said brake application;
at least one brake-pressure adjusting actuator for adjusting brake pressures of said plurality of wheels, said at least one brake-pressure adjusting actuator increasing brake pressures of said plurality of wheels by using hydraulic pressure generated by said master cylinder;
a controller for controlling said at least one brake-pressure adjusting actuator so that said slip states of said plurality of wheels fall within a predetermined state, wherein when slowing a vehicle to a speed below a predetermined value by braking, said at least one brake-pressure adjusting actuator gradually increases the brake pressures applied to said plurality of wheels until the brake pressures applied to said plurality of wheels substantially become equal to hydraulic fluid pressure generated by said master cylinder.

8. An antickid control apparatus according to claim 7 wherein said at least one brake-pressure adjusting actuator gradually increases the brake pressures applied to said plurality of wheels by repeatedly and alternately carrying out a pressure-holding mode and a pressure-increasing mode.

9. An antiskid control apparatus according to claim 8, wherein said pressure-holding mode and said pressure-increasing mode are repeatedly and alternately carried out a first predetermined number of times.

10. An antiskid control apparatus according to claim 9, wherein said controller controls said at least one brake-pressure adjusting actuator such that when the brake pressures are increased during antiskid control, said pressure-holding mode and said pressure increasing mode are repeatedly and alternately carried out up to second predetermined number of times, and said first predetermined number of times is greater than said second predetermined number of times.

11. An antiskid control apparatus according to claim 7, wherein said controller controls said at least one brake-pressure adjusting actuator such that the brake-pressures applied to front wheels are increased and the brake pressures applied to rear wheels are maintained at a constant value.

12. An antiskid control apparatus according to claim 11, wherein the brake pressures applied to said front wheels are gradually increased by repeatedly and alternately carrying out a pressure-holding mode and a pressure-increasing mode.

13. An antiskid control apparatus according to claim 7, wherein said controller increases the brake pressures applied to said plurality of wheels using different timings.

14. An antiskid control apparatus according to claim 13, wherein said controller limits a brake pressure increase operation using a different timing only when a driving speed drops below the predetermined value due to said brake application.

15. An antiskid control apparatus comprising,
a slip state detector for detecting a slip state of a wheel upon application of a brake;
a master cylinder which generates hydraulic fluid pressure in response to said brake application, said master cylinder being the sole pressure generating source for said antiskid control apparatus;
at least one brake-pressure adjusting actuator for adjusting a brake pressure of said wheel, said at least one brake-pressure adjusting actuator increasing the brake pressure of said wheel by using hydraulic pressure generated by said master cylinder;
a controller for controlling said at least one brake-pressure adjusting actuator so that said slip state of said wheel falls within a predetermined state, said controller controlling said at least one brake-pressure adjusting actuator such that a number of operations to increase the brake pressure per unit time is within a predetermined range.

16. An antiskid control apparatus according to claim 15, wherein said controller controls said at least one brake-pressure adjusting actuator in such a manner that said at least one brake-pressure adjusting actuator gradually increases the brake pressure applied to said wheel with the number of pressure-increasing operations per unit time within said predetermined range when the slip state of said wheel is small and decreases or maintains the brake pressure applied thereto when the slip state thereof is large.

17. An antiskid control apparatus according to claim 16, further comprising:
a counter for counting a number of consecutive pressure-increasing operations carried out by said at least one brake-pressure adjusting actuator; and
a controller which adjusts an increase amount in brake pressure resulting from one pressure-increasing operation carried out by said at least one brake-pressure adjusting actuator so that a number of consecutive operations counted by said counter is within said predetermined range.

18. An antiskid control apparatus according to claim 15, wherein said controller increases the brake pressures applied to said plurality of wheels using different timings.

19. An antiskid control apparatus according to claim 18, wherein said controller limits a brake pressure increase operation using a different timing only when a driving speed drops below the predetermined value due to said brake application.

20. An antiskid control apparatus according to claim 15, wherein said at least one brake pressure adjusting actuator increases the brake pressure by using 1.5 to 3.5 pressure-increasing operations per second.

21. An antiskid control apparatus according to claim 15, wherein said at least one brake-pressure adjusting actuator increases the brake pressure applied to said wheel by supplying hydraulic fluid flowing out of said master cylinder and decreases or maintains the brake pressure applied thereto by prohibiting hydraulic fluid from flowing from said master cylinder.

* * * * *